(12) United States Patent
Beaty et al.

(10) Patent No.: US 11,328,617 B2
(45) Date of Patent: May 10, 2022

(54) PLATFORM FOR IMPLEMENTING A PERSONALIZED LEARNING SYSTEM

(71) Applicant: RedCritter Corp., Flower Mound, TX (US)

(72) Inventors: Robert M. Beaty, Flower Mound, TX (US); Randy M. Whelan, Coppell, TX (US); Erika D. Lambert, Flower Mound, TX (US); David R. Jenness, Flower Mound, TX (US); Dan D. Hoffman, Flower Mound, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 359 days.

(21) Appl. No.: 16/358,619

(22) Filed: Mar. 19, 2019

(65) Prior Publication Data

US 2020/0302818 A1    Sep. 24, 2020

(51) Int. Cl.
*G09B 7/00* (2006.01)
*G09B 7/06* (2006.01)

(52) U.S. Cl.
CPC . *G09B 7/00* (2013.01); *G09B 7/06* (2013.01)

(58) Field of Classification Search
CPC ... G09B 5/00; G09B 5/02; G09B 7/00; G09B 7/07; G09B 7/077
See application file for complete search history.

(56) References Cited

U.S. PATENT DOCUMENTS

| | | | | |
|---|---|---|---|---|
| 5,002,491 A * | 3/1991 | Abrahamson | ............ | G09B 5/14 434/322 |
| 6,022,221 A * | 2/2000 | Boon | ..................... | G09B 5/065 434/118 |
| 6,652,283 B1 * | 11/2003 | Van Schaack | ........... | G09B 7/00 434/236 |
| 2006/0286536 A1 * | 12/2006 | Mohler | .................... | G09B 5/00 434/350 |
| 2007/0269788 A1 * | 11/2007 | Flowers | .................. | G09B 7/06 434/350 |
| 2009/0077479 A1 * | 3/2009 | Tucci | ...................... | G09B 7/04 715/764 |
| 2011/0091859 A1 * | 4/2011 | Hall | ......................... | G09B 7/08 434/350 |
| 2019/0114937 A1 * | 4/2019 | Capps | ................ | G06Q 10/0639 |

* cited by examiner

*Primary Examiner* — Peter R Egloff
(74) *Attorney, Agent, or Firm* — Kirton McConkie; Brian Tucker

(57) ABSTRACT

A platform can be employed to implement a personalized learning system that is simple to use, streamlined and scalable thereby enabling such systems to be seamlessly implemented in any learning environment. The platform can be implemented in a client-server environment in which a server or servers maintain a number of data structures which can be used to define students, assignments, classes, flashcards, videos, and learning standards definitions, among many others. A number of backend processes, websites, and web APIs can be configured to allow users to access the content of these data structures as well as to create new entries in these data structures to thereby facilitate the implementation of a personalized learning system that incorporates automation and machine learning in a school, workplace or other learning environment.

20 Claims, 38 Drawing Sheets

Student Table 211a

| UserID | FirstName | LastName | ... |
|---|---|---|---|
| Student01 | Alyssa | Mayer | ... |
| Student02 | Brian | McGavin | ... |
| Student03 | Cecila | Cardenas | ... |
| Student04 | Lucy | Wooten | ... |
| ... | | | |

Teacher Table 211b

| UserID | FirstName | LastName | ... |
|---|---|---|---|
| Teacher01 | Keith | Hunt | ... |
| Teacher02 | Greg | Mowery | ... |
| ... | | | |

Class Table 211c

| ClassID | TeacherID | ClassName | ... |
|---|---|---|---|
| Class01 | Teacher01 | English | ... |
| Class02 | Teacher02 | Science | ... |
| ... | | | |

Student/Class Table 211d

| ClassID | UserID | FirstName | LastName | ... |
|---|---|---|---|---|
| Class01 | Student01 | Alyssa | Mayer | ... |
| Class01 | Student02 | Brian | McGavin | ... |
| Class01 | Student03 | Cecila | Cardenas | ... |
| Class02 | Student01 | Alyssa | Mayer | ... |
| ... | | | | |

Goals Table 212a

| GoalID | LearningStandardID | Tasks | AssignedUsers | DueDate | LearningCurve | ... |
|---|---|---|---|---|---|---|
| Goal01 | LS01 | Task_List1 | User_List1 | Date1 | Curve_Data1 | ... |
| Goal02 | LS02 | Task_List2 | User_List2 | Date2 | Curve_Data2 | ... |
| ... | | | | | | |

212

User/Goals Table 212b

| UserID | GoalID | Status | Outcome | Points | ... |
|---|---|---|---|---|---|
| Student01 | Goal01 | Expired | Completed | 6 | ... |
| Student02 | Goal02 | Active | Null | 1 | ... |
| ... | | | | | |

*FIG. 3B*

Forms Table 213a — 213

| FormID | FormConfiguration | FormComposition |
|---|---|---|
| Form01 | Configuration01 | Composition_List1 |
| Form02 | Configuration02 | Composition_List02 |
| ... | ... | ... |

Learning Standards Table 214a

| LearningStandardID | Name | Enabled | ... |
|---|---|---|---|
| LS01 | Common Core | True | ... |
| LS02 | TEKS | True | ... |
| ... | | | |

Learning Standard Item Table 214b

| LearningStandardID | Classification | Sub-Classification | SubSplit0 | SubSplit1 | SubSplit2 | GradeLevel | MissCnt | ... |
|---|---|---|---|---|---|---|---|---|
| LS01 | 8 | G.A.1 | G | A | 1 | 192 | 0 | ... |
| LS01 | 4 | O.A.B.4 | OA | B | 4 | 12 | 1 | ... |
| LS02 | 5 | 1.A.i | 1 | A | i | 224 | 5 | ... |
| ... | | | | | | | | |

*FIG. 3D*

Flashcard Table 215a ~ 215

| CardID | LearningStandardID | Classification | Sub-Classification | Question | Answer | ... |
|---|---|---|---|---|---|---|
| Card01 | LS01 | 8 | G.A.1 | ... | ... | ... |
| Card02 | LS01 | 8 | G.A.1 | ... | ... | ... |
| ... | | | | | | |

User Card Table 215b

| UserID | CardID | Slot | ... |
|---|---|---|---|
| Student01 | Card01 | 1 | ... |
| Student01 | Card02 | 2 | ... |
| Student01 | Card03 | 3 | ... |
| ... | | | |

Outcomes Table 216a

| UserID | CardId | LearningStandardID | Outcome | Date | ... |
|---|---|---|---|---|---|
| Student01 | Card01 | LS01 | Completed | 2/1/2019 | ... |
| Student02 | Card01 | LS01 | Failed | 3/1/2019 | ... |
| Student01 | Card02 | LS01 | Completed | 3/3/2019 | ... |
| ... | | | | | |

| Assignment Table 217a | | |
|---|---|---|
| UserID | FormID | Date | ... |
| Student01 | Form01 | 3/15/2019 | ... |
| Student01 | Form02 | 3/11/2019 | ... |
| Student01 | Form03 | 4/1/2019 | ... |
| | ... | | |

| Subject | Subject | Student | Student | Teacher |
|---|---|---|---|---|
| Math | Science | Charlotte Fields | Liam Johnston | Zoey Benjamin |

Is the sun hot or cold?

○ Hot
○ Cold

Submit Answer

Is the sun hot or cold?

75% of your class answered this question correctly

Hot
Cold

*FIG. 12C*

PLATFORM FOR IMPLEMENTING A PERSONALIZED LEARNING SYSTEM

CROSS-REFERENCE TO RELATED APPLICATIONS

N/A

BACKGROUND

The present invention is generally directed to a platform that can be employed to implement a personalized learning system for use within a school, workplace or other learning environment. More particularly, the present invention is directed to a platform that can facilitate the implementation of an efficient and scalable personalized learning system.

One problem faced by many educators today is finding ways to assess each student's knowledge in order to provide learning content and materials that are tailored to the student's personal strengths and weaknesses. It is known that individually tailored learning content is a very effective way to encourage student learning. This however is difficult to accomplish at scale given the significant variations in each student's knowledge and knowledge gaps. For example, in a school environment, if a classroom has a 16 to 1 student-teacher ratio, a teacher will rarely be able to asses each student's knowledge to identify where each student needs to improve. Even if the teacher is able to assess each student's knowledge, it is virtually impossible to provide individually tailored learning content to each student. This difficulty grows with the student-teacher ratio.

Furthermore, educators find it difficult or impossible to address every student's individual knowledge gaps in view of the school's goal-based priorities. For example, if a student has a weakness in fractions and adverbs, educators may find it difficult to determine the relative importance of improving one over the other.

It is increasingly important for educational institutions to perform well on standardized state and national tests. Accordingly, principals, administrators and teachers can greatly benefit from the ability to determine an estimated likelihood of how every student will score on any given test at any point in time. Without insights into where all students in a school stand, it is difficult to address student shortcomings before these important tests are taken.

Principals and administrators also need a near effortless means to intervene at a teacher level or student level based on granular performance data collected for each student or teacher. Static reports cannot provide interactive means of intervening or tracking interventions.

Teachers also have difficulty determining the effectiveness of specific practice questions, content, videos and other materials. This may be due primarily to the fact that tests are taken relatively infrequently as well as to the inability to track which content students used as study materials in preparation for the tests. Such difficulties prevent teachers from identifying and providing the most effective and relevant materials to each individual student.

Teachers simply do not have sufficient time to create custom learning materials to address the students' personal gaps in knowledge. Even if they could create custom learning materials, more time is required to identify which custom learning materials may be most appropriate for each individual student.

BRIEF SUMMARY

The present invention extends to a platform which can be employed to implement a personalized learning system that is simple to use, streamlined and scalable thereby enabling such systems to be seamlessly implemented in any learning environment. The platform can be implemented in a client-server environment in which a server or servers maintain a number of data structures which can be used to define students, assignments, classes, flashcards, videos, and learning standards definitions, among many others. A number of backend processes, websites, and web APIs can be configured to allow users to access the content of these data structures as well as to create new entries in these data structures to thereby facilitate the implementation of a personalized learning system that incorporates automation and machine learning in a school, workplace or other learning environment.

In some embodiments, the present invention is implemented as a method for creating flashcards using a digital assessment form. A user is provided a user interface that includes a digital assessment form that is configured to receive input defining questions and corresponding answers. Each question is associated with a learning standard section. A first request is received to create a flashcard for a first question that has been defined in the digital assessment form. The first request identifies the first question, the corresponding answer and the associated learning standard section. In response to the first request, one or more entries are created in a flashcards database. The one or more entries define a first flashcard for the first question and map the first question to the associated learning standard section. A second request is received to assign the first flashcard to a first student. In response to the second request, one or more entries that associate the first student with the first flashcard are created in the flashcards database.

In another embodiment, the present invention is implemented as a personalized learning system that includes a forms database, an assignment database, a flashcards database, and one or more servers. The forms database defines digital assessment forms where each digital assessment form represents an assessment and defines questions, corresponding answers and learning standard sections associated with the questions. The assignment database associates digital assessment forms with students to thereby define when the students will be taking the corresponding assessments. The flashcards database defines flashcards where each flashcard defines a question, a corresponding answer and a learning standard section to which the question relates. The flashcards database also defines flashcard decks that have been assigned to students where each flashcard deck includes a plurality of flashcards. The one or more servers are configured to employ the forms database, the assignment database and the flashcards database to assign flashcard decks to students based on assessments that the students will be taking. The one or more servers assign a particular flashcard deck to a particular student by: accessing the assignment database to identify digital assessment forms that are associated with the particular student; accessing the forms database to obtain the identified digital assessment forms; processing each of the identified digital assessment forms to determine which learning standard sections are associated with the questions defined in each of the digital assessment forms; selecting a first digital assessment form; selecting flashcards from the flashcards database that match the learning standard sections that are associated with the questions defined in the first digital assessment form; and creating entries in the flashcards database that assign the selected flashcards to the particular student.

In another embodiment, the present invention is implemented as computer storage media storing computer executable instructions which when executed by one or more processors implement a method for presenting flashcards to a student based on the student's performance. The method includes: creating, in a flashcards database, a flashcard deck for a student, the flashcard deck including a plurality of flashcards, each flashcard defining a question, a corresponding answer and an associated learning standard section, each flashcard also being assigned to a particular slot of a plurality of slots in a slot structure; and iteratively presenting flashcards from the flashcard deck to the student by: selecting a particular flashcard from the flashcard deck using an algorithm, the algorithm applying a probability of selection to flashcards that is based on the slot to which the flashcards are assigned; presenting the particular flashcard to the student; determining whether the student has provided a correct answer to the question defined in the particular flashcard; when the student has provided the correct answer, changing the slot to which the particular flashcard is assigned to reduce the probability of selection of the particular flashcard; and when the student has not provided the correct answer, changing the slot to which the particular flashcard is assigned to increase the probability of selection of the particular flashcard.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3G illustrate various example data structures that can be maintained in databases of the platform;

FIGS. 6B-6D illustrate example user interfaces that the platform can create to track the students completion of tasks defined within a goal;

FIG. 7 illustrates an example dashboard that the platform can create and present to a user;

FIGS. 11A-11D illustrate examples of user interfaces that can be presented to a teacher during a flashcard session; and FIGS. 12A-12C, which correspond to FIGS. 11A-11D, illustrate examples of user interfaces that can be presented to students during the flashcard session.

DETAILED DESCRIPTION

In the following description, the platform of the present invention will primarily be described with reference to an embodiment in which the platform is employed to implement a personalized learning system in a school environment. However, the present invention should not be limited to use in any particular environment. For example, the platform could equally (and concurrently) be employed in a workplace environment.

Because the present invention will be described in the context of a school environment, the term "student" as used in the description should be construed broadly as encompassing any individual that belongs to a group that is overseen by another individual. The term "teacher" should be construed as an individual that oversees such a group. The term "administrator" should be construed as an individual that oversees a group of teachers (e.g., a principal). Therefore, in a workplace environment, an employee may be considered a student, the employee's manager may be considered a teacher, and the head of human resources may be considered an administrator.

The term "learning standard" should be construed as a standard that governs education or learning. Common examples include the Common Core standard, the Texas Essential Knowledge and Skills (TEKS) standard and other state or governmental standards pertaining to K-12 education. A learning standard may also be a standard or regulations that govern a particular industry (e.g., GAAP, HIPAA, OSHA, etc.). The terms "learning standard section," "learning standard classification" and similar terms will be used to identify a portion of a learning standard as opposed to the learning standard in general. For example, the Common Core is divided into a hierarchical arrangement of standards. For clarity, these standards will be referred to or identified as learning standard sections or classifications.

Figure 1:
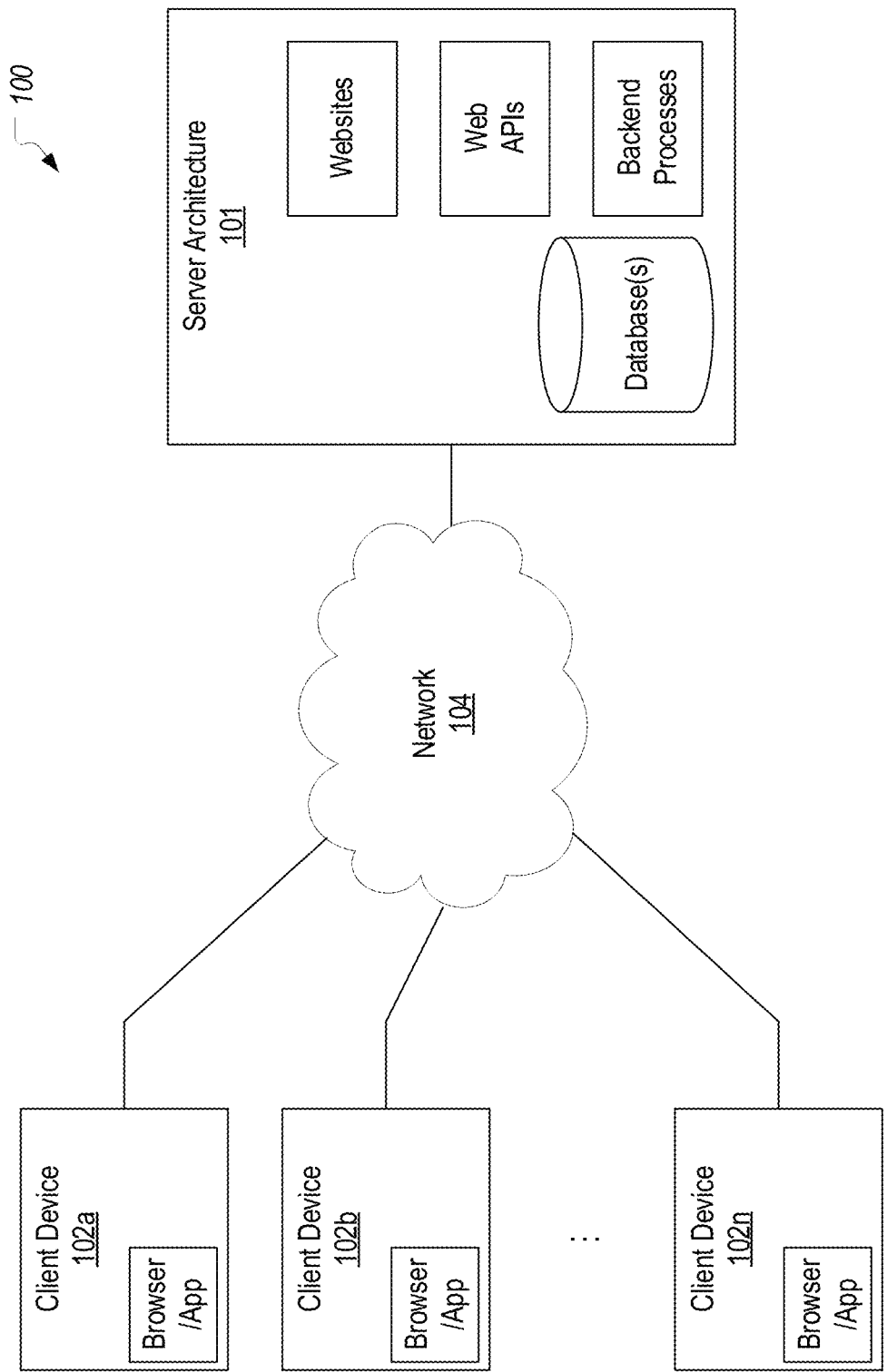
FIG. 1 illustrates an example computing environment in which the platform of the present invention can be implemented.

FIG. 1 illustrates an example computing environment 100 in which the present invention can be implemented. Computing environment 100 includes a server architecture 101 and a number of client devices 102*a*-102*n* (where n represents any integer) which are interconnected via a network 104 which may typically be, but is not required to be, the internet. Also, in some embodiments, client devices 102*a*-102*n* may intercommunicate using a peer-to-peer network in addition to communicating with server architecture 101 via network 104.

Server architecture 101 can represent any suitable server architecture including cloud-based architectures (e.g., the platform of the present invention may be deployed in an AWS or Azure cloud). As shown, server architecture 101 may implement a number of different components of the platform including databases, websites, web application programming interfaces (APIs), and backend processes. Client devices 102a-102n can represent end-user computing devices such as desktops, laptops, tablets, mobile phones, digital assistants, televisions, etc. In FIG. 1, these client devices are shown as including a browser or a dedicated application which can be employed to communicate with server architecture 101 as will be further described below.

Figure 2:
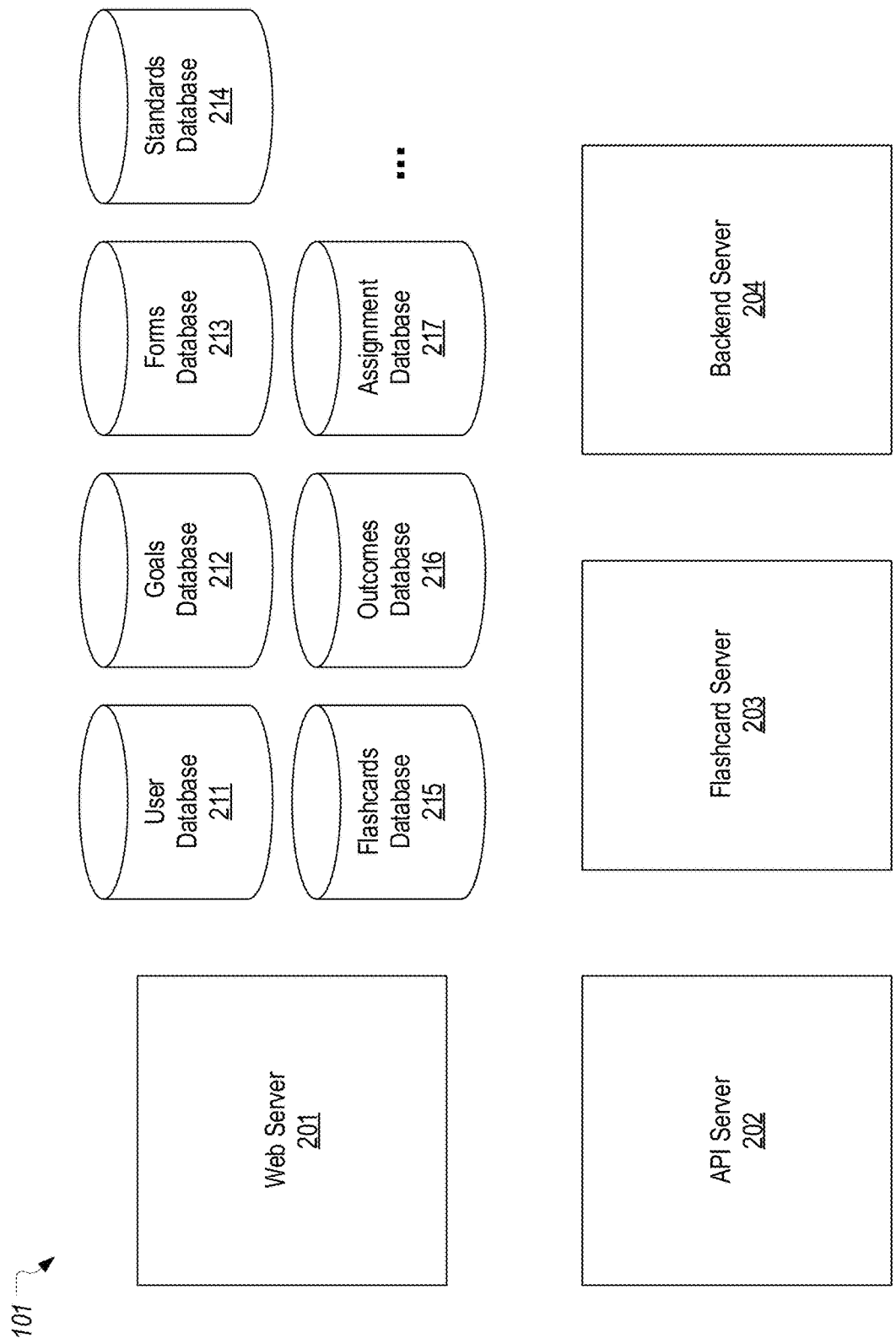
FIG. 2 illustrates various server-side components of the platform of the present invention.

FIG. 2 provides a more detailed illustration of server architecture 101. As shown, server architecture 101 can include a web server 201, an API server 202, a flashcard server 203 and a backend server 204, among possibly many other servers. In this context, the term "server" should be construed in accordance with its standard meaning as a program or service that provides functionality to clients. In the context of the present invention, these servers interoperate to provide the functionality of a personalized learning system to users of client devices 102a-102n. Each of the illustrated servers may be implemented on or across any number of machines including physical and virtual machines.

To enable web server 201, API server 202, flashcard server 203 and backend server 204 to provide a personalized learning system, server architecture 101 encompasses a number of databases including a user database 211, a goals database 212, a forms database 213, a standards database 214, a flashcards database 215 an outcomes database 216 and an assignment database 217. Each of these databases can be configured to store records in a unique manner that facilitates the provision of a personalized learning system as will be described in detail below. Additionally, web server 201, API server 202, flashcard server 203 and backend server 204 can each be configured to implement unique functionality for creating, accessing and/or updating records in at least one of databases 210a-210f as part of providing a personalized learning system. In short, server architecture 101 is uniquely configured as a scalable platform that facilitates the implementation of a personalized learning system.

Web server 201 can represent the server-side components that provide webpages to users of client devices 102a-102n and that respond to at least some of the users' interactions with the content of such webpages. As an example, web server 201 can provide a portal by which students, teachers and administrators can access functionality of a personalized learning system. Such functionality can include providing content for use in creating a flashcard data structure, a standards data structure, a goals data structure, etc., requesting that particular flashcards be sent to a student, reviewing a student's progress towards a goal, etc. In short, web server 201 functions as the primary interface by which end users interact with the platform.

API server 202 can represent the server-side components that provide APIs by which the other servers (or clients 102a-102n by means of content provided by the other servers) can invoke functionality of the platform. These APIs may be invoked in response to a user's interactions with web server 201, in response to a user's interactions with another server, in response to events that occur on any of the other servers, etc. As will be described in detail below, a primary function of API server 202 is to create and maintain records in the various databases using a unique structure and to employ the unique structure of such records to automatically and adaptively personalize learning content for a particular student.

Flashcard server 203 can represent the server-side components that are configured to interface with third party servers for the purpose of presenting flashcards to students via the students' digital assistants (e.g., Google Assistant, Alexa, Cortana, Siri, etc.). Flashcard server 203 can also be configured to employ APIs of API server 202 to report the students' interactions with the digital assistants when flashcards are presented.

Backend server 204 can represent the server-side components that evaluate a student's performance within the personalized learning system and predicts areas where the student is likely to perform poorly on future assignments. Based on this predictive analysis, backend server 204 can identify flashcards that will best address such areas. As will be described in detail below, the unique structure of the various databases enable backend server 204 to perform this predictive analysis in an effective and adaptive manner.

FIGS. 3A-3G illustrate simplified examples of various data structures (e.g., tables) that can be stored in the various databases. Although tables are shown, each of the databases can be configured to store records/content in any suitable manner. FIG. 3A represents data structures that may be stored in user database 211 including a student table 211a, a teacher table 211b, a class table 211c and a student/class table 211d. As their names suggest, student, teacher, and class tables 211a-211c store entries pertaining to students, teachers, and classes respectively. In a workplace environment, these tables could alternatively store, for example, entries pertaining to employees, managers, and groups respectively.

As shown, student table 211a and teacher table 211b can each include a number of fields including a UserID field which stores a unique identifier for the student or teacher, a FirstName field, and a LastName field among possibly many other fields. Although student and teacher tables 211a/211b are shown as separate tables, they may equally be structured as a single table that includes a column defining whether the entry defines a student or teacher. Accordingly, the exact structure of the example tables is not essential to the present invention.

In the examples shown in FIG. 3A, it is assumed that four students (Alyssa Mayer, Brian McGavin, Cecila Cardenas, and Lucy Wooten) and two teachers (Keith Hunt and Greg Mowery) have been registered with the platform. It is also assumed that two classes (English and Science) have been created in the platform. Each class entry can include a unique identifier, ClassID, and a teacher identifier, TeacherID. For example, the entries in class table 211c indicate that the English class is taught by Keith Hunt (because the English entry includes Teacher01 as its TeacherID) and the Science class is taught by Greg Mowery (because the Science entry includes Teacher02 as its TeacherID). Accordingly, each entry in class table 211c can provide, among other things, a description of the class and an identifier of the teacher of that class (or, in other embodiments, a manager/supervisor of another type of group). Next, to define which students belong to a particular class, student/class table 211d can be employed. As shown, each entry in student/class table 211d can include a ClassID and a UserID, the combination of which uniquely identifies a student's belonging to a particular class. Although the use of the tables in user database 211 will not be described in detail, one of skill in the art would understand how these tables could be employed when carrying out the functionality described below.

FIG. 3B represents data structures that may be stored in goals database 212 including a goals table 212a and a user/goals table 212b. Each entry in goals table 212a defines a goal using a number of fields including a GoalID field which defines a unique identifier for the goal, a LearningStandardID field which defines a learning standard section that is associated with the goal, a Tasks field which defines the tasks that must be completed to reach the goal, an AssignedUsers field which defines the users to which the goal has been assigned, a DueDate field which defines the deadline for completing the goal, and a LearningCurve field which defines a curve that can be used to compare the assigned users' progress relative to a desired performance.

User/goals table 212b includes entries that associate a particular user to a particular goal and that can be used to track the user's performance. For example, user/goals table 212b is shown as including a UserID field which can store the UserID of the user to which the goal has been assigned, a GoalID field which can store the GoalID of the goal, a Status field which defines the status of the goal (e.g., whether the goal is still active), an Outcome field which defines the outcome of the goal (e.g., whether the user completed the goal or the extent to which the user completed the goal), and a Points field which defines a number of points that the user has earned from completion of the tasks defined in the goal. Although not shown, the points for a goal, or for each completed task in the goal, can be defined in the corresponding entry in goals table 212a. Accordingly, user/goals table 212b facilitates identifying each goal that has been assigned to a student and the student's performance on such goals. Additionally, by using student/class table 211d in conjunction with user/goals table 212b, the performance of all students in a particular class on assigned goals can be quickly and easily obtained (e.g., for display to a teacher or administrator).

FIG. 3C provides a simplified representation of the data structures that may be maintained within forms database 213. As shown, forms database 213 can include a forms table 213a which includes entries defining digital assessment forms (or simply "forms"). A form can represent a quiz, test, assessment or other collection of questions and answers that can be presented to a student. As will described below, the platform allows teachers, administrators or other users to use forms to define a collection of questions that are associated with a learning standard or learning standard section and to create flashcards from these questions. Forms table 213a generally represents that each form can be assigned a FormID that is mapped to a FormConfiguration and a FormComposition.

A form's configuration consists of the arrangement of questions and corresponding answers (e.g., an arrangement into sections where each section is associated with a learning standard section). For example, Configuration01 could define a first section that is associated with section 8.G.A.1 of the Common Core and defines ten questions and corresponding answers. A form's configuration can also define an action that should be taken when a student answers a question incorrectly and may link video content to a particular question. As will be further described below, this action can include issuing a flashcard to the student.

A form's composition consists of a mapping between each learning standard section defined in the form and the percentage of questions defined in the form that relate to the particular learning standard section. For example, Composition List1 could define that 50% of the questions defined in Form01 are related to a first section of the Common Core, 30% of the questions are related to a second section of the Common Core, and 20% of the questions are related to a third section of the Common Core.

FIG. 3D represents data structures that may be stored in standards database 214 including a learning standards table 214a and a learning standard item table 214b. Learning standards table 214a includes entries which define a LearningStandardID for each learning standard that has been created in the platform. As shown, learning standards table 214a can map the LearningStandardID to a name of the learning standard (e.g. Common Core or TEKS) and define whether the particular standard is enabled.

Learning standard item table 214b is employed to define the individual learning standard sections of the learning standards. Given that learning standards are typically defined in a hierarchical fashion, learning standard item table 214b can be configured to flatten the hierarchical structure to thereby enable the efficient searching of applicable learning standard sections. As shown, there is a one-to-many relationship between an entry in learning standards table 214a and entries in learning standard item table 214b. In the depicted example, learning standard item table 214b includes two entries having a LearningStandardID of LS01. Of course, an actual implementation would include many such entries. Each entry maps the LearningStandardID to a Classification, Sub-Classification, a number of Sub-Splits, a GradeLevel, and a MissCnt, among various other fields that are not depicted.

As is known, learning standards employ learning standard codes to define each section of the learning standard. The Classification field defines the first portion of the corresponding learning standard code. For example, if the learning standard code is 8.G.A.1, the Classification field would be 8. The Sub-Classification field defines the learning standard code with the first portion removed. For example, the Sub-Classification would be G.A.1 for the learning standard code 8.G.A.1. The Sub Split fields define each individual value of the Sub-Classification (e.g., each value other than the first value that is split by a period in the learning standard code). Although the figures depict only three SubSplit fields, learning standard item table 214b could include more than three such fields.

The GradeLevel field is used to define to which grade levels the corresponding learning standard section applies. This can be accomplished by representing each grade level with a binary value and then performing an exclusive OR of the binary values assigned to each applicable grade. As an example, grades 1-12 could be assigned the binary values of 1, 2, 4, 8, 16, 32, 64, 128, 256, 512, 1024, and 2048 respectively. Each of these binary values constitutes a single "1" that is shifted left at each grade level. As a result, whether a particular entry in learning standard item table 214b is applicable to any given grade level can be determined by simply checking the value of the bit in the corresponding position. The MissCnt field defines the number of times that a search for a flashcard related to the corresponding learning standard section did not return a result as will be described in detail below.

FIG. 3E represents data structures that may be stored in flashcard database 215 including a flashcard table 215a and a user card table 215b. Flashcard table 215a includes entries which define flashcards. As shown, each flashcard includes a unique CardID that is associated with a learning standard and learning standard section (e.g., by defining a classification and sub-classification within the learning standard). Each flashcard also includes a question and answer among possibly many other fields. User card table 215b includes entries which define which flashcards have been assigned to students by mapping a UserID to the CardID. User card table 215b also includes a slot field which defines the slot to which the particular flashcard is assigned as will be described below. Although not shown, user card table 215b can include a number of other fields such as fields that define when the assigned student last attempted to answer the question presented in the flashcard, whether the last attempt was successful, how many times the student has skipped the flashcard, when the last skip occurred, when the flashcard was assigned to the student, which teacher assigned it, etc.

FIG. 3F represents data structures that may be stored in outcomes database 216 including an outcomes table 216a. Outcomes table 216a can be used to define the students' outcomes on flashcards. As shown, outcomes table 216a includes an entry representing each time a flashcard has been assigned to a student and defines an outcome representing whether the student successfully answered the question provided in the flashcard along with a date of the outcome. Each entry can also define the learning standard (including the classification and sub-classification) with which the flashcard is associated. Outcomes table 216a therefore facilitates identifying a class's, school's or organization's performance on a particular learning standard section.

FIG. 3G represents data structures that may be stored in assignment database including an assignment table 217a. Entries in assignment table 217a can identify, among other things, a student, a form representing a quiz, test or assessment that has been assigned to the student and a date on which the student will take the quiz, test or assessment.

Figure 4A:
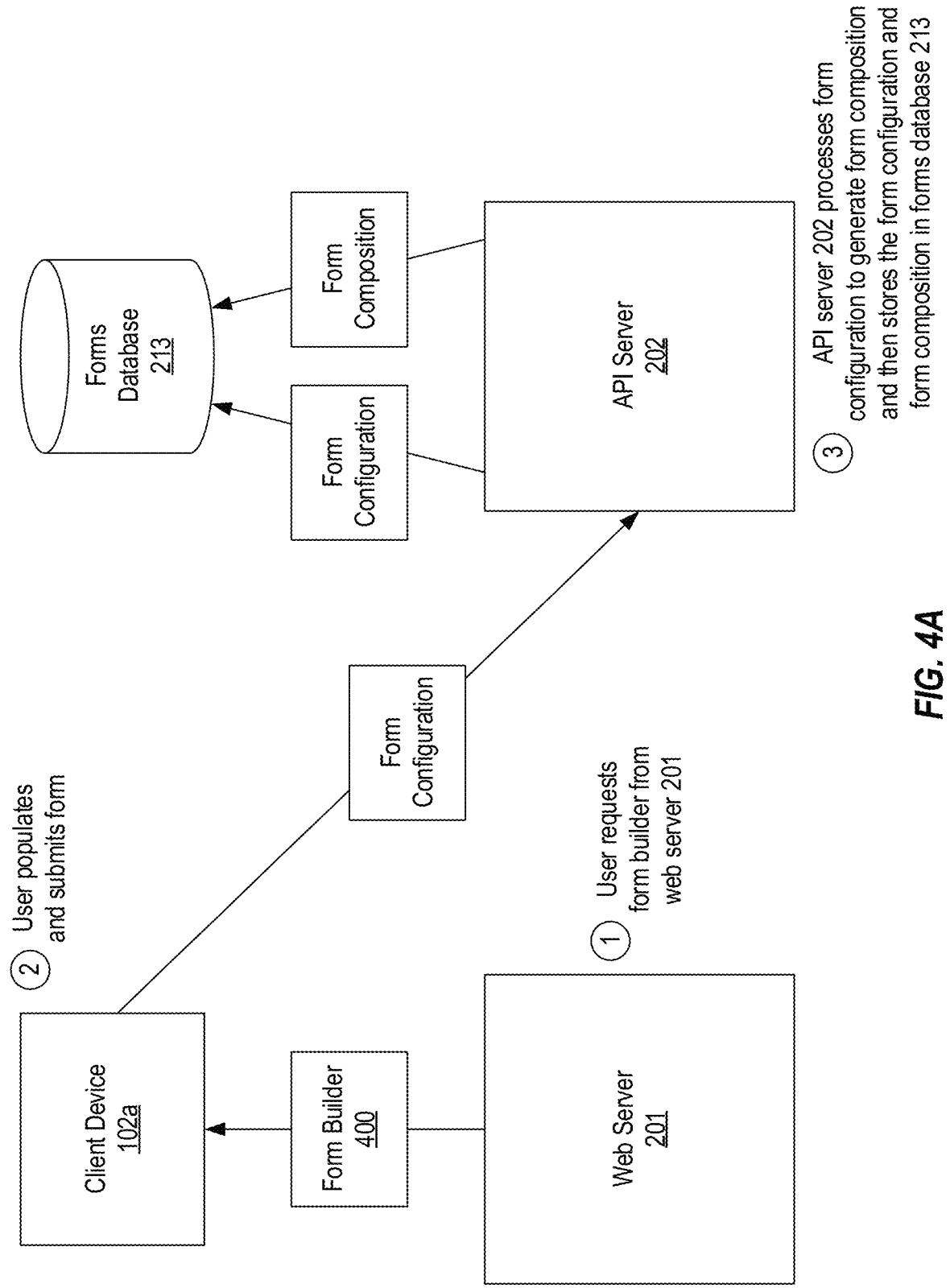
FIG. 4A illustrates an example of how the platform enables a user to create a collection of questions (or assessment) using a form.
Figure 4B:
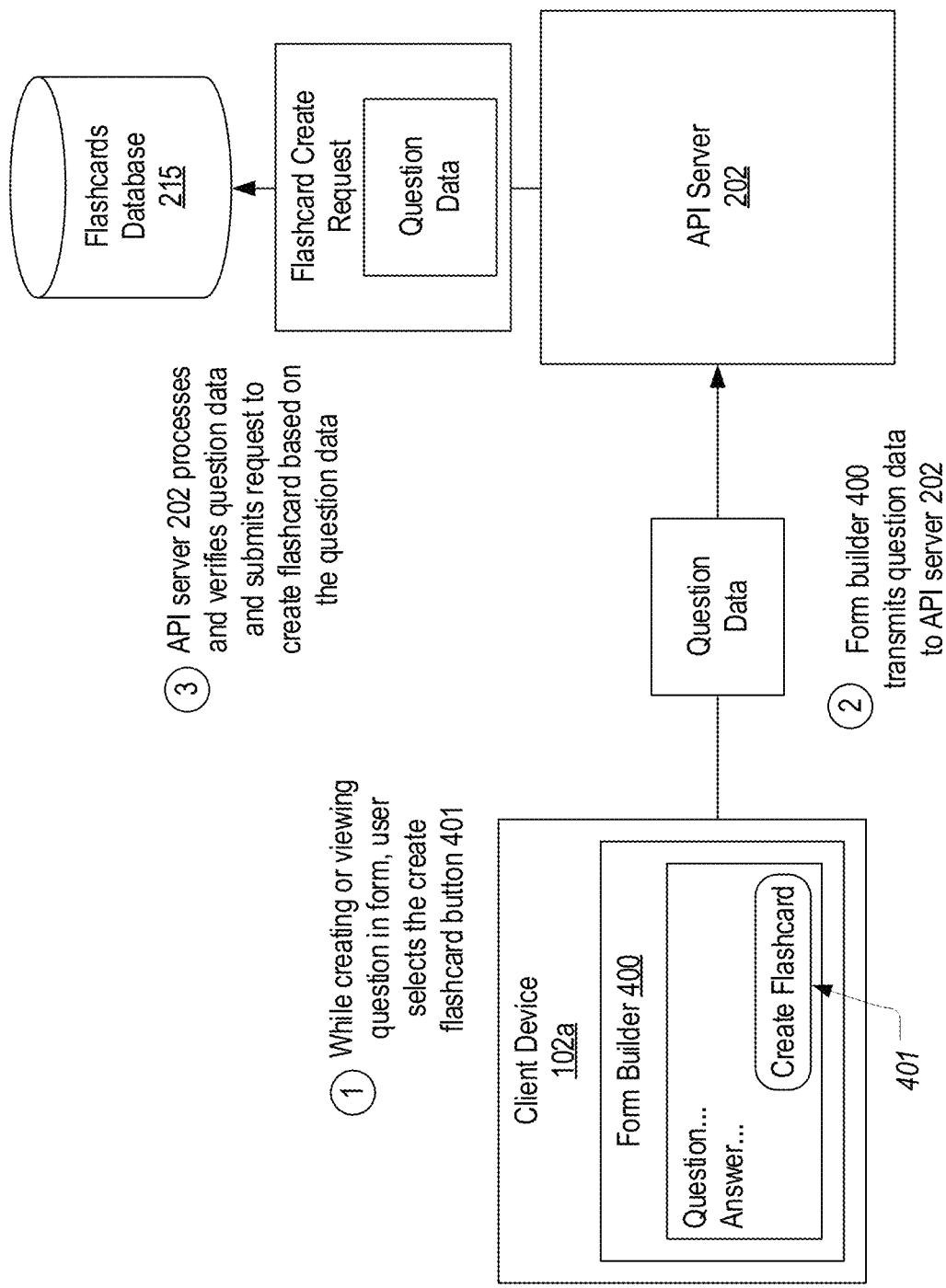
FIG. 4B illustrates an example of how the platform enables a user to create a flashcard based on a question defined within a form.

FIGS. 4A and 4B illustrate how the platform enables a user to create a collection of questions (e.g., for a quiz, test, assessment, etc.) using a form and to create a flashcard based on a question defined within the form. Examples of the user interfaces that can be employed during this process are provided in FIGS. 9A-9D and described below. FIG. 4A depicts a sequence of steps that can be performed when a user employs a form builder 400 to create a collection of questions. In step 1, the user requests form builder 400 from web server 201. For example, a teacher could employ client device 102a to visit a website provided by web server 201 that includes form builder 400. In step 2, the teacher can input questions and answers into form builder 400, specify the learning standard section associated with each question and submit the form. As indicated above, the arrangement of questions, answers, learning standard sections, etc. define the form configuration. Accordingly, when the user submits the form, the form configuration is sent to API server 202. In step 3, API server processes the form configuration to generate a form composition and then stores the form configuration and form composition in forms database 213 (e.g., by creating an entry in forms table 213a that maps a FormID to the form configuration and form composition).

As described above, API server 202 can process the form configuration, or more specifically, the questions and associated learning standard sections, to create the form composition which defines the percentage of questions that relate to each learning standard section. In some embodiments, API server 202 may include a learning standard section in the form composition only when the number of questions related to the learning standard section exceeds a configurable minimum number and when the questions exceed a configurable minimum percentage of the total questions defined in the form composition. For example, API server 202 may include a learning standard section in a form composition only when at least five questions in the form composition relate to the learning standard section and when those questions represent at least 25% of the total number of questions. By defining a form composition, the platform facilitates the creation of personalized learning content as will be described below.

FIG. 4B represents how a user can cause a flashcard to be created by interacting with form builder 400. FIG. 4B illustrates that form builder 400 is displayed on client device 102a (e.g., within a browser) and that the user is viewing a particular question and answer. Although not shown, the user will have defined a learning standard section for this question. Form builder 400 includes a create flashcard button 401 that is displayed in the portion of the form where the user defines the question and which the user can select to cause a flashcard to be created for the question. In step 1, it is assumed that the user selects the create flashcard button 401. In response, and as represented by step 2, form builder 400 transmits the question data to API server 202. This question data can include the question, answer and associated learning standard section. Although not shown, this question data can also define actions that should be performed when the question is not answered correctly. For example, the question data can define that the flashcard to be created should be presented to a student if the student answers the question incorrectly while taking the quiz, test or assessment that the form defines. Additionally, the question data could identify video content that has been associated with the question so that the video content can be associated with the flashcard. In step 3, API server 202 processes the question data to confirm that it includes all of the information necessary to create a flashcard (e.g., whether the question data defines a valid learning standard section), and if so, submits a request to flashcards database 215 to create a flashcard based on the question data. For example, API server 202 could submit a request to create an entry in flashcard table 215a.

As can be seen, form builder 400 and API server 202 facilitate the process of creating flashcards as part of creating a quiz, test or other assessment. A teacher or other user can simply create questions and answers that are associated with a particular learning standard section and then request the creation of a flashcard with the click of a button. The way in which flashcards are stored in flashcards database 215 facilitates the selection and presentation of flashcards that are most appropriate to a particular student's needs.

Figure 4C:
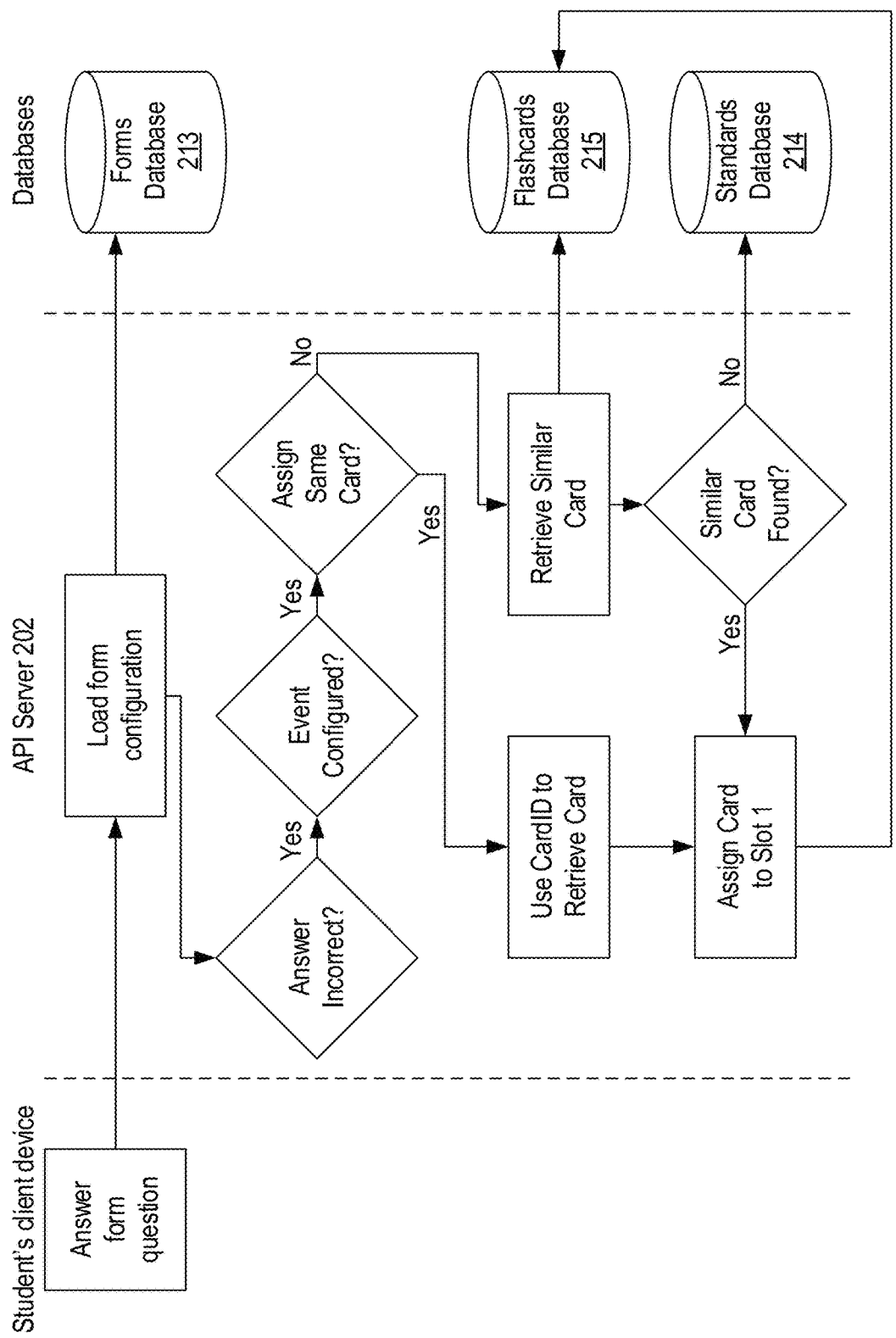
FIG. 4C illustrates how the platform can automatically assign a flashcard to a student when the student answers a particular question incorrectly.

FIG. 4C illustrates how a flashcard can be automatically assigned to a student when the student answers a particular question incorrectly. In FIG. 4C, it is assumed that the student is using a client device to take the quiz, test or assessment that was previously created as a form as represented in FIG. 4A. For example, the student can access a webpage provided by web server 201 within which the questions are presented and which is configured to receive the student's answers and submit them to API server 202. When the user submits an answer to a particular question, the answer along with an identifier of the question can be submitted to API server 202. API server 202 can then access forms database 213 to retrieve the corresponding form configuration and use it to determine whether the answer is correct.

If the answer is incorrect, API server 202 may retrieve any video content associated with the flashcard and present it to the student (e.g., by providing a link to the video content). If the answer is incorrect, API server 202 can also employ the form configuration to determine whether an event has been configured for incorrect answers to the particular question. As described above, the event could define that the flashcard created for the particular question should be assigned or that a similar flashcard should be assigned. If an event has been configured for the particular question, API server 202 can determine whether the event defines that the same flashcard should be assigned (i.e., whether the flashcard created from that question should be assigned). If so, API server 202 can employ the CardID to retrieve the flashcard and assign it to slot 1 in the student's flashcard deck (which will be described below). For example, API server 202 can employ the CardID to retrieve the contents of the corresponding entry in flashcard table 215a and then use the contents of the entry and the student's UserID to create an entry in user card table 215b.

If the event defines that a similar flashcard should be assigned (i.e., a flashcard that is associated with the same learning standard section), API server 202 can query flashcards database 215 to retrieve similar flashcards (e.g., by querying for entries in flashcard table 215a that match a specified learning standard classification and sub-classification). If a similar flashcard is found, API server 202 can assign it to slot 1 in the student's flashcard deck. However, if a similar flashcard is not found (which may occur if no flashcards for the particular classification and sub-classification have been created or if all other flashcards for the particular classification and sub-classification are currently assigned to or have been completed by the student), API server 202 can update standards database 214 to reflect that insufficient flashcards exist for the particular learning standard classification and sub-classification (e.g., by incrementing the MissCnt field of the corresponding learning standard item in learning standard item table 214b).

By tracking the MissCnt for each learning standard item, the platform can facilitate the identification of learning standard sections for which a sufficient number of flashcards have not been created. For example, API server 202 can provide an API by which learning standard items that have a MissCnt above a defined threshold can be retrieved by a teacher or an administrator. In some embodiments, API server 202 can also include functionality for comparing learning standard items with a MissCnt in excess of the defined threshold to a school's defined goals. For example, standards database 214 can define a weight for each learning standard section to thereby prioritize some sections over others. API server 202 can be configured to present learning standard items that have insufficient flashcards in an order that is based both on the value of the MissCnt and the priority given to the corresponding section. Each time a new flashcard is created, the MissCnt for the corresponding section can be decremented.

Figure 5A:
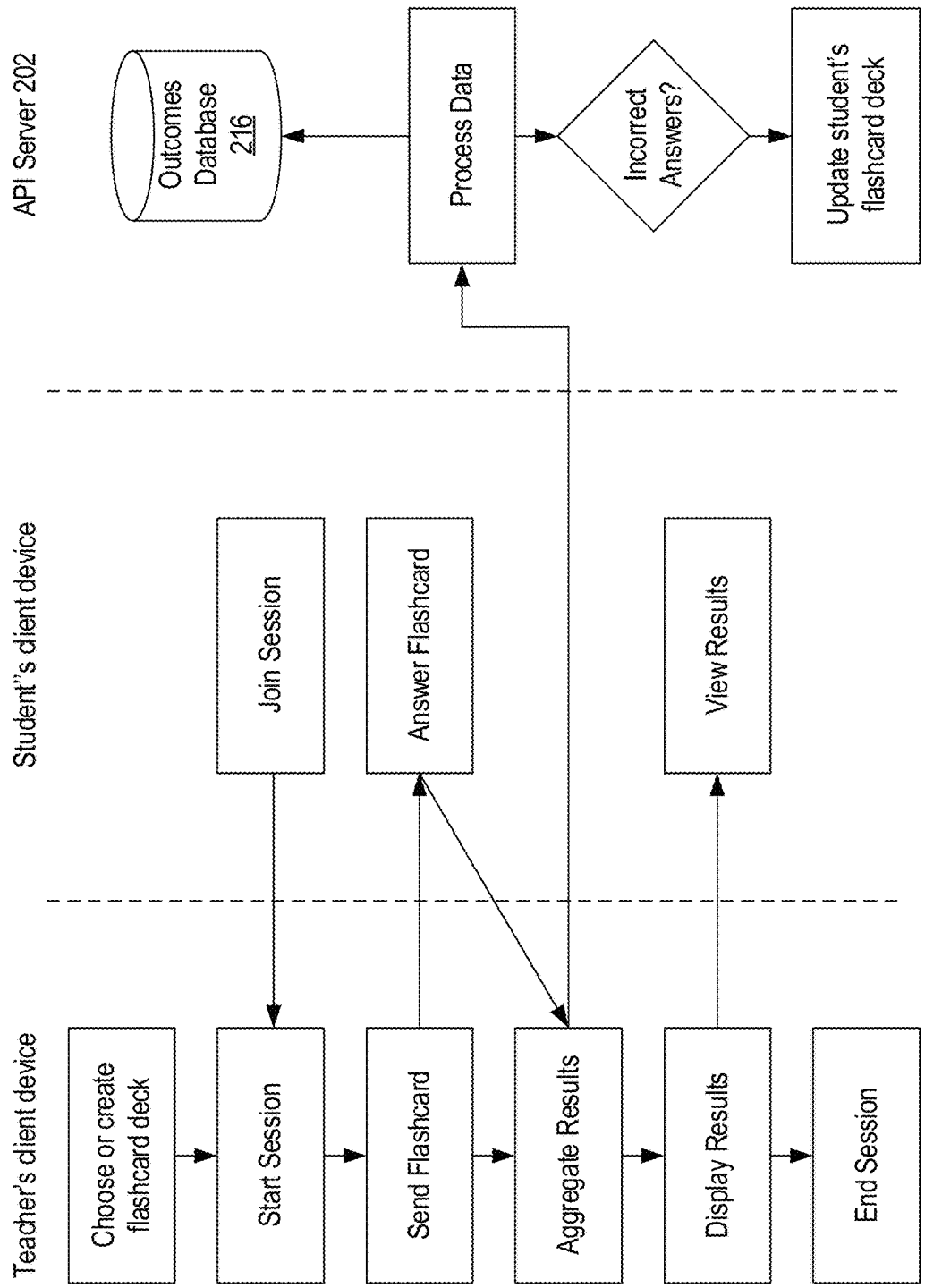
FIG. 5A illustrates a process by which a teacher or other user can perform a flashcard session with students.

FIG. 5A illustrates a process by which a teacher or other user can perform a flashcard session with students. Examples of the user interfaces that can be employed during this process are provided in FIGS. 10A-10F, 11A-11D and 12A-12C and described below. A teacher and the students in a class can each employ a client device to join a session in which a deck of flashcards are presented to each student. To initiate the session, the teacher can choose or create a flashcard deck consisting of multiple flashcards. This can be accomplished by visiting a webpage provided by web server 201. In some embodiments, the same flashcard deck can be created/selected for each student in the class or a separate flashcard deck can be created/selected for each student. In a typical case, a teacher may request the creation of a flashcard deck that is based on an upcoming quiz, test or assessment such that the flashcards that are selected will match the learning standard sections that are covered by the quiz, test or assessment. The selection of the flashcards can also be based on each particular student's prior performance on flashcards (e.g., by accessing outcomes database 216) to thereby include flashcards related to learning standard sections that the student has not mastered. In any case, with the flashcard deck(s) identified, the teacher can start a flashcard session to which each student may join (e.g., by visiting a webpage provided by web server 201).

During the session, the teacher can send a flashcard to the student. The student can then review the question presented in the flashcard and provide an answer. The answer can be routed back to the teacher for review. Additionally, the answer can be submitted to API server 202 (e.g., by submitting the CardID along with the student's answer) which will process the answer to determine if it is correct. If the answer is incorrect, API server 202 can update the student's flashcard deck. The process by which the flashcard deck is updated will be described below. As the students proceed through the session, their answers can be aggregated and the results displayed for the teacher and the students to review. Additionally, the results can be provided to API server 202 which can store them in outcomes database 216 (e.g., by adding an entry to outcomes table 216a for each student's result on each flashcard).

Figure 5B:
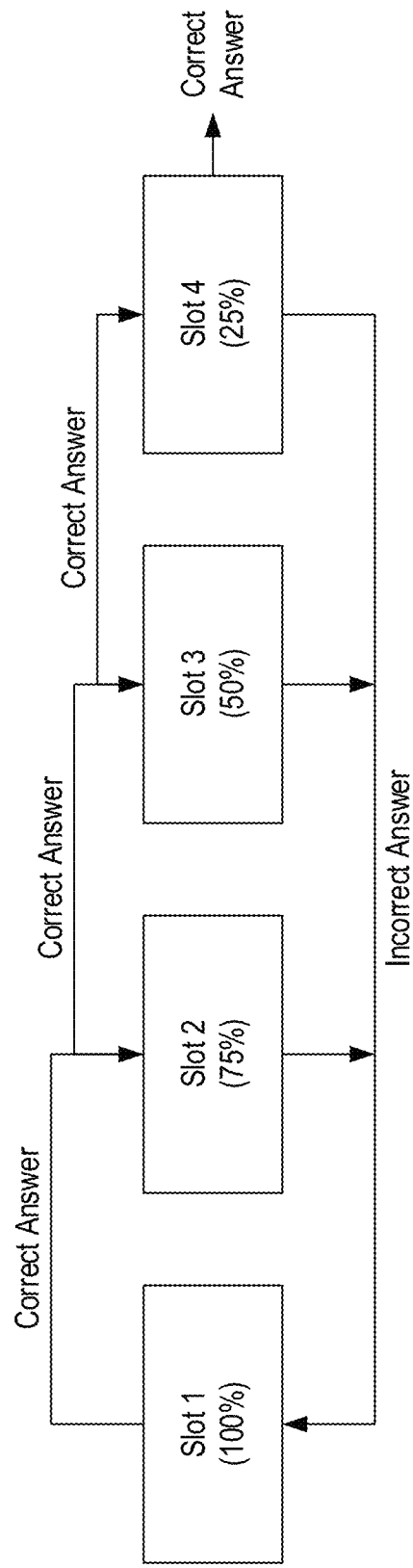
FIG. 5B illustrates how a student's flashcard deck can be dynamically updated using a slot structure and based on the student's performance on the flashcards.

FIG. 5B illustrates how a student's flashcard deck can be dynamically updated using a slot structure and based on the student's performance on the flashcards. In this example, it will be assumed that the slot structure includes four slots. Each flashcard in the student's flashcard deck (i.e., each flashcard that has been assigned to the student) can be assigned to one of the slots. Therefore, multiple cards will likely be assigned to each of the slots. The particular slots are used to control the frequency at which the flashcards are presented to the student.

In FIG. 5B, a portion of user card table 215b is shown and identifies four flashcards that have been assigned to a student with a UserID of Student01. These four flashcards (Card01-04) have been assigned to slots 1-4 respectively. Although not shown, user card table 215b could include a number of additional entries for Student01 representing flashcards that have also been assigned to the student and will therefore be assigned to one of the four slots.

Based on the student's performance on the flashcards included in the flashcard deck (e.g., during the session represented in FIG. 5A), API server 202 can modify user card table 215b to update to which slot each flashcard in the student's deck is assigned as well as to add flashcards to and remove flashcards from the deck. As represented in FIG. 5B, each slot is assigned a percentage which is used when selecting which flashcard to present to the student. In this example, slot 1 is assigned 100%, slot 2 is assigned 75%, slot 3 is assigned 50% and slot 4 is assigned 25%, although different percentages could equally be used. The algorithm for selecting a flashcard to present to the student uses these percentages as well as a time when the flashcard was last presented.

For this example, it will be assumed that none of the flashcards that are assigned to the slots have been previously presented. Therefore, the algorithm will select a flashcard assigned to slot 1 given that flashcards assigned to slot 1 have a probability of selection of 100%. In contrast, if all flashcards assigned to slot 1 had been previously presented (e.g., less than four hours ago), the algorithm would select a flashcard from slot 2 since such flashcards are assigned the second highest percentage. In terms of a database query, API server 202 can identify a flashcard to present to the student by selecting all flashcards that have been assigned to the student (e.g., by running a SELECT query that specifies the student's UserID against user card table 215b), excluding each flashcard that has been presented within a defined period of time (e.g., within the past four hours), possibly excluding each flashcard that the student has skipped within a specified amount of time, sorting the remaining flashcards using the assigned percentage and then presenting the topmost flashcard in the sorted list.

In addition to using this slot structure to select flashcards, API server 202 can also update the slot to which a flashcard is assigned to ensure that the flashcards that are presented to the student cover the learning standard sections that the student has not yet mastered. In particular, if the student answers the flashcard's question correctly, API server 202 can shift the flashcard to the next slot (e.g., by incrementing the value of the slot field in the corresponding entry in user card table 215b). As a result, the flashcard that the student answered correctly will be less likely to be presented relative to flashcards that the student has not yet answered correctly. If the student answers a flashcard correctly and the flashcard is assigned to slot 4 (or to the last slot in the slot structure), API server 202 can remove the flashcard from the student's deck (e.g., by removing the corresponding entry from user card table 215b). In other words, after the student has answered the flashcard correctly four consecutive times, API server 202 will remove the flashcard from the student's deck.

In contrast, if the student answers a question incorrectly, API server 202 can move the corresponding flashcard back to slot 1 (assuming it is not already in slot 1). This will ensure that the flashcard that the student answered incorrectly will be placed in the slot with the highest probability of selection. As mentioned above, the selection algorithm that API server 202 employs will prevent this flashcard from being immediately repeated. Accordingly, the configuration of API server 202 and the structure of flashcards database 215 facilitates the presentation of flashcards that provide questions that are personalized to an individual student's performance. Regardless of whether the student answers a flashcard correctly or incorrectly, API server 202 can update outcomes database 216 to record the answer.

During a flashcard session, API server 202 can employ outcomes database 216 to provide real-time results to the teacher's client device. These results can include an average of each student's results during the current flashcard session, a comparison of the class's results to historical results of other classes in the school, etc. API server 202 can also enable the teacher to present a student's individual results during the flashcard session on the student's client device. In some embodiments, API server 202 can also group together students in the class based on their results during the flashcard session (e.g., by grouping students with a correct answer percentile within a particular range) and issue awards accordingly.

Figure 5C:
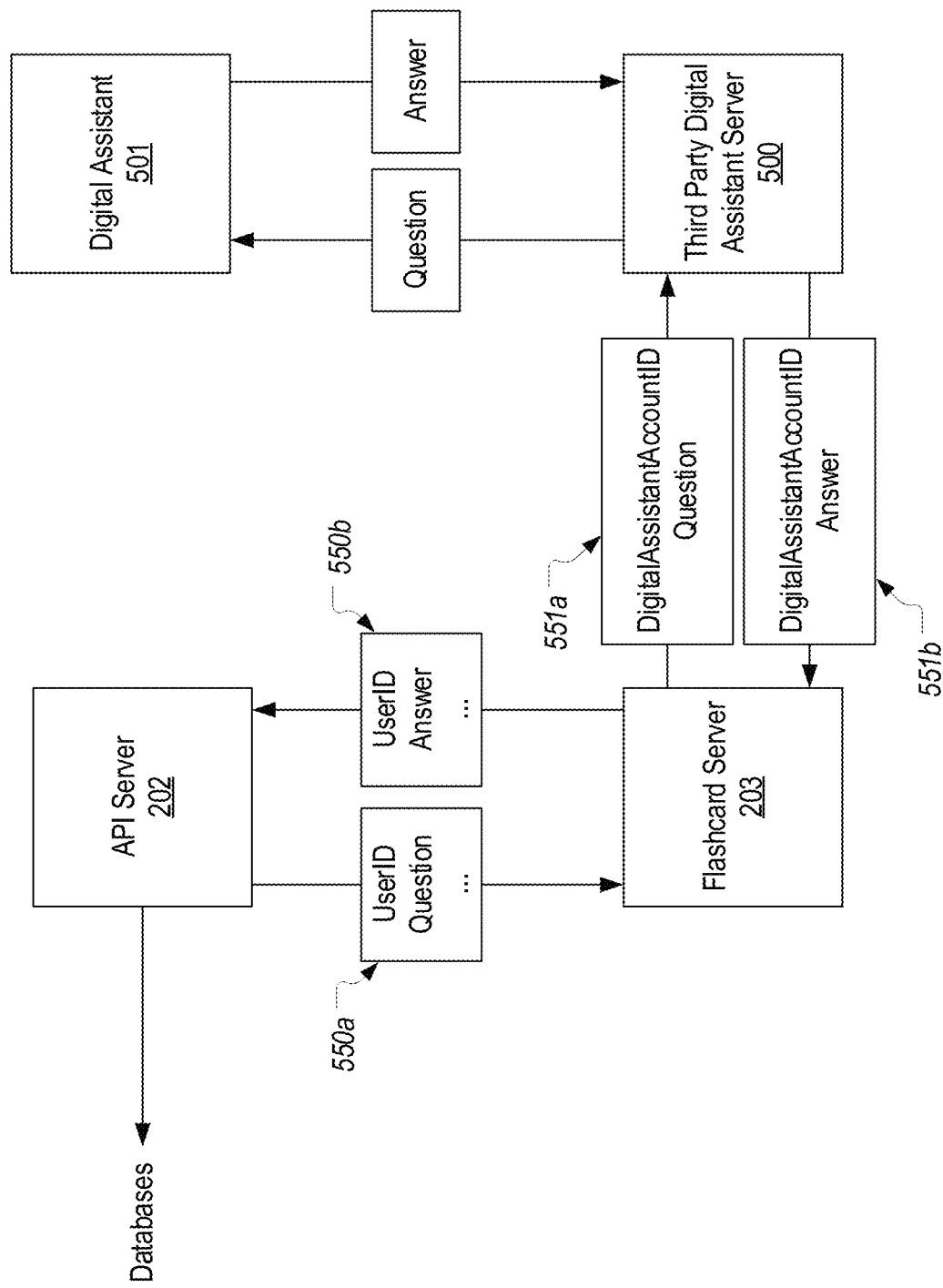
FIG. 5C illustrates how the platform enables a student to participate in a flashcard session using a digital assistant.

FIG. 5C illustrates how the platform enables a student to participate in a flashcard session using a digital assistant. In these embodiments, the process by which API server 202 selects flashcards to be presented to the student can be similar to what is described above. This process, however, can be initiated by the student based on interactions with a digital assistant. For example, the student could employ a digital assistant such as Google Assistant, Alexa, Cortana or Siri to initiate a flashcard session.

As is represented in FIG. 5C, when a student requests a flashcard session on a digital assistant, API server 202 can select a flashcard to be presented (e.g., as described above with reference to FIG. 5B) and can then send a request 550a to flashcard server 203. Request 550a can include the student's UserID and the question among possibly other content. Flashcard server 203 can employ the UserID to determine how to communicate with the appropriate digital assistant. For example, when a student registers a digital assistant to be used with the platform, the student can specify a digital assistant account ID (e.g., the user's Google username). Flashcard server 203 can maintain a mapping between the student's platform UserID and the student's digital assistant account ID.

In response to request 550a, flashcard server 203 can identify the corresponding digital assistant account ID as well as the corresponding third party digital assistant server 500. For example, assuming the student has registered a Google account, third party digital assistant server 500 can represent Google's API server that provides third party access to the Google Assistant. Flashcard server 203 can then create a request 551a that is formatted in accordance with the API exposed by third party digital assistant server 500 and that includes the question of the selected flashcard. Third party digital assistant server 500 will then use the content of request 551a to identify the student to which the request pertains and then present the question to the student's digital assistant (e.g., to whatever client device the student is logged into under the student's digital assistant account).

The student can then provide an answer to the question (e.g., by typing in an answer, providing touch input to a user interface displayed by the digital assistant, speaking an answer to the digital assistant, etc.). The answer will then be routed back to third party digital assistant server 500 which will in turn send a response 551b to flashcard server 203 that includes the answer. Response 551b can be sent in accordance with the API that third party digital assistant server 500 provides. Flashcard server 203 can then send a response 550b to API server 202 which includes the answer and that identifies the student's UserID. In this way, API server 202 will receive the student's answer in much the same was as described above with reference to FIG. 5B and can update the appropriate databases. For example, based on whether the student answered correctly (which can be determined by accessing forms database 213 to retrieve the appropriate form that contains the answer), API server 202 can query flashcards database 215 to update the student's flashcard deck and select another flashcard. Similarly, API server 202 can query outcomes database 216 to add an entry defining the student's result on the flashcard.

Figure 6A:
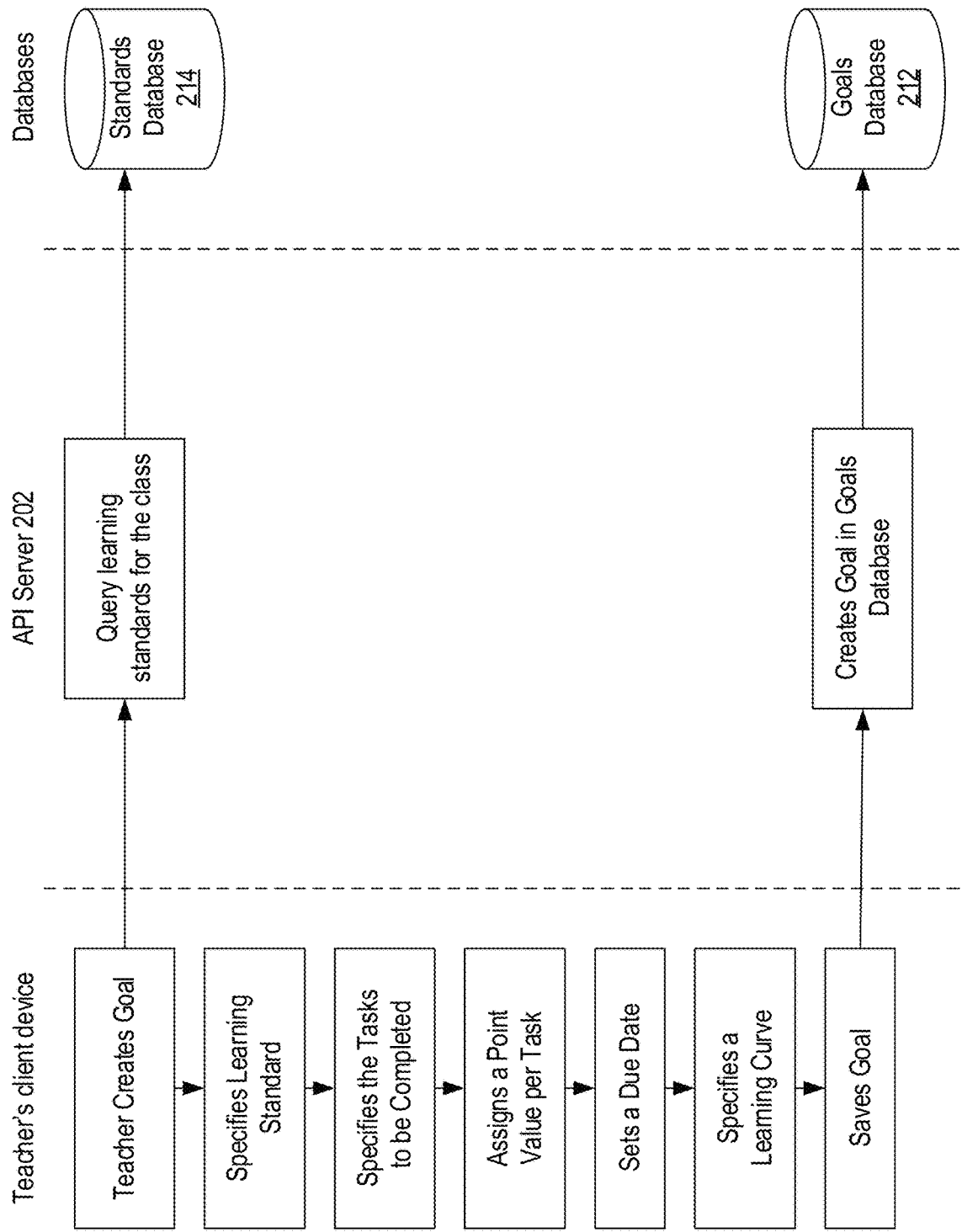
FIG. 6A illustrates how the platform enables a teacher to create a goal for one or more students.

FIG. 6A illustrates how API server 202 enables a teacher to create a goal for one or more students. A teacher can employ a client device to access a webpage provided by web server 201 (or a dedicated application that receives content from web server 201) which includes functionality for receiving and sending information for defining a goal to API server 202. As shown, a teacher can first create a goal such as by defining a name for the goal and identifying the students to which the goal is assigned. The teacher can also specify the learning standard section applicable to the goal (e.g., section 8.G.A.1 of the Common Core), the specific tasks to be completed to reach the goal, a point value assigned to each task, a due date for competing the goal and a learning curve.

Figure 6B:
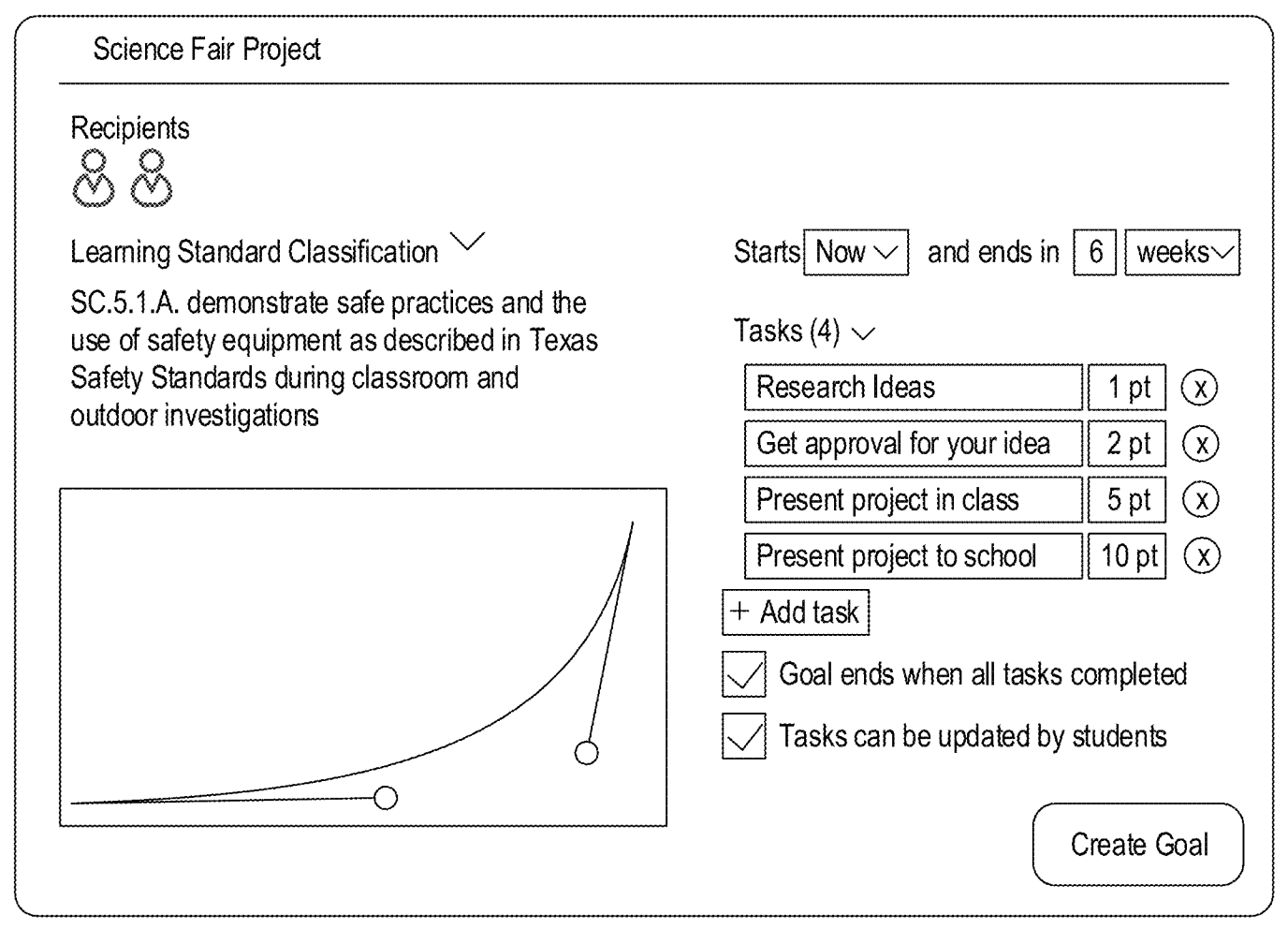

FIG. 6B provides an example user interface by which the teacher can provide this input. As indicated above, this user interface could be in the form of a webpage that is viewed within a browser, in the form of a dedicated application (e.g., a mobile app), or any other form. When the teacher creates a goal, API server 202 can query standards database 214 to retrieve all learning standard sections that are applicable to the class. As described above, this can be accomplished using the GradeLevel field in each learning standard item.

API server 202 can then customize the user interface to allow the teacher to select from among these applicable learning standard sections. FIG. 6B also shows that the teacher can manually define the shape of the learning curve which is used to provide a point of comparison for the student's progress. This learning curve represents points on the y axis and time on the x axis. Accordingly, the learning curve provides a graphical representation of actual progress vs. expected progress that is easy for even young children to understand.

When the teacher selects the Create Goal button, the content populated into the user interface can be submitted to API server 202 as shown in FIG. 6A. API server 202 can then generate appropriate queries to create a goal within goals database 212. For example, API server 202 can create an entry in goals table 212a that links a GoalID to the appropriate LearningStandardID, task list, user list, due date, learning curve, etc. API server 202 can also create an entry for each assigned student in the user/goals table 212b.

Figure 6C:
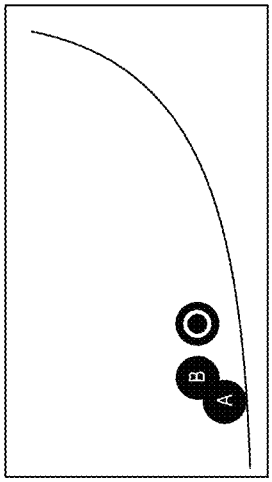
Figure 6C:
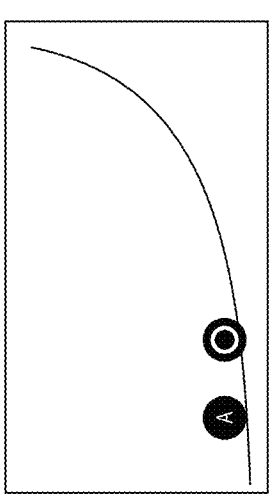
Figure 6D:
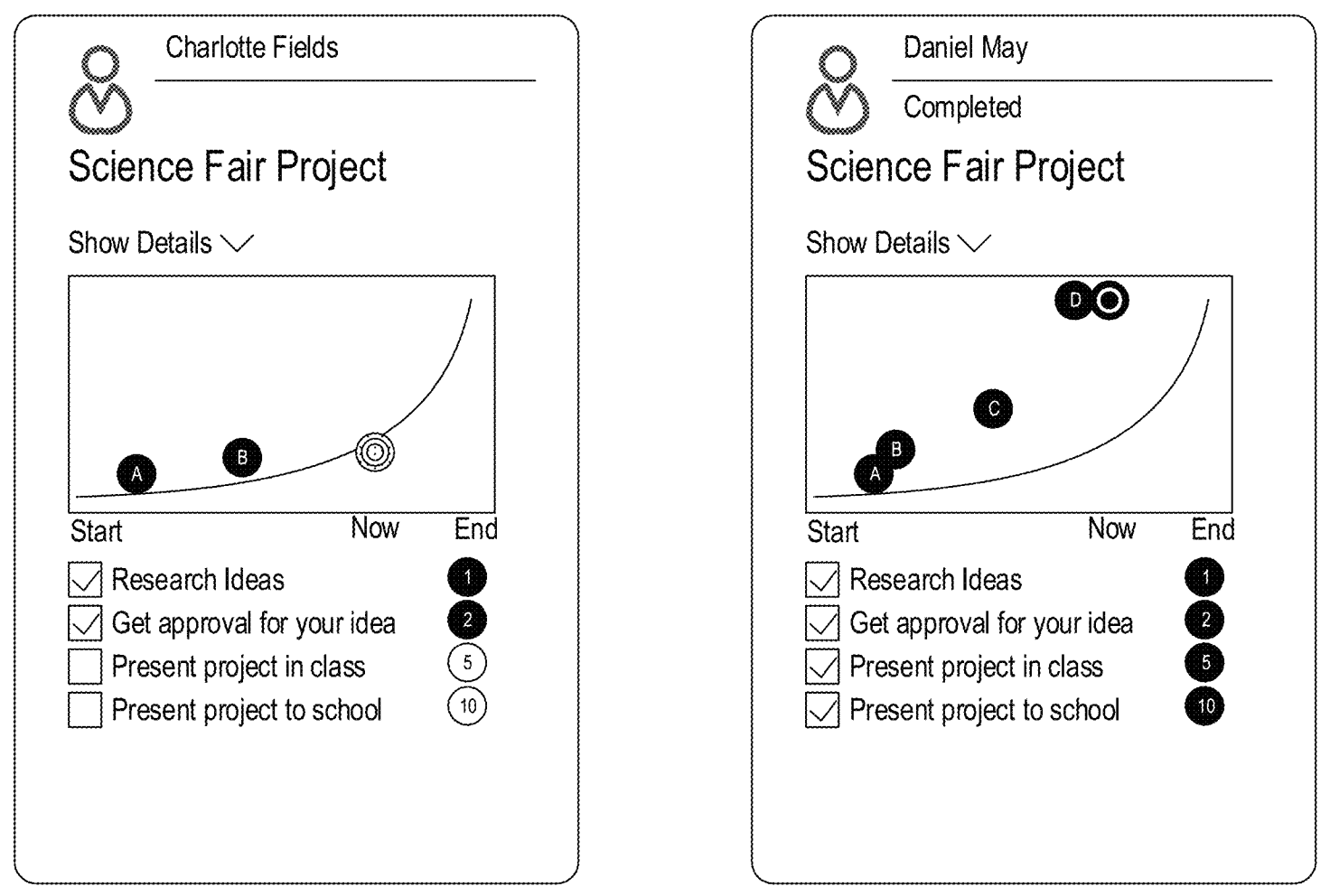

With a goal created, the teacher, students and administrator can view the students' progress on the goal. FIGS. 6C and 6D illustrate example dashboards that the platform can provide to enable users to track a student's progress on a goal. FIG. 6C illustrates the progress of two students, Charlotte Fields and Daniel May, on the same goal. In this dashboard, the learning curve is displayed along with indicators of the student's progress on the various tasks. The completion of each task can be represented on the learning curve using an icon that is positioned based on the point value of the task and the time when the task was completed. In this example, the first task is represented by a circle with the letter A. As shown, both students completed the first task, which is worth 1 point, at approximately the same time. The learning curve also includes a current progress indicator in the form of a circle that is positioned based on the current time and the current point total earned by the student. Because the learning curve represents the desired progression on the tasks, the position of the current progress indicator relative to the curve defines whether the student is on track to complete the goal. In particular, if the current progress indicator falls below the learning curve, it will define that the student is falling behind. The appearance of the current progress indicator can be updated based on whether it is above or below the curve.

FIG. 6D represents the dashboard at a subsequent time. At this point, Daniel May has completed all four tasks and therefore has been awarded the full 18 points for these tasks. His current progress indicator has therefore reached the top of the curve. In contrast, Charlotte Fields has only completed the first two tasks and has been award only 3 points. Her current progress indicator is therefore positioned below the learning curve and therefore has been changed in appearance to notify the viewer that she has fallen behind.

In some embodiments, a task defined in a goal can only be marked as completed by the teacher. In other embodiments, a student may be allowed to mark a task as completed. In either case, when a task is marked completed, a notification can be provided to API server 202 which in turn can update goals database 212 (e.g., by updating the corresponding entry in user/goals table 212b to increment a point total and/or to mark the goal as completed). In some embodiments, outcome database 216 may also be employed to store outcomes of students' performance on goals. In such cases, API server 202 can update outcomes database 216 when the completion of a task also completes the goal.

As can be seen, the platform enables the creation of goals and the display of the students' progress towards these goals in a simple and easy-to-use manner. In particular, the structure of goals database 212 and the configuration of API server 202 facilitate tracking and displaying a student's progress.

FIG. 7 illustrates an example dashboard that the platform can create and present to users. For example, in response to an administrator's request to view the dashboard, API server 202 can query the various databases to compile the performance data for the entire school for each of a number of subjects. With reference to FIG. 3F, API server 202 can query outcomes table 216a to obtain the students' results on each flashcard and can then aggregate these results based on the learning standard section. For example, FIG. 7 illustrates that separate scores have been created representing the performance of all students in the school on flashcards related to science and on flashcards related to math. These scores can be broken down based on the classification and sub-classification of each learning standard. In some embodiments, API server 202 can employ a formula that decays older results so that improvement will be more clearly reflected in the scores.

FIG. 7 also shows that a score can be generated for each student's performance on flashcards related to each subject. For example, the scores represent that Daniel May has completed many math-related flashcards and fewer science-related flashcards. FIG. 7 also shows that scores can be created at the teacher level based on the performance of the students in that teacher's classes. For example, FIG. 7 represents that students in Zoey Benjamin's science class have performed well on science-related flashcards, whereas students in Liam Johnston's science class have performed poorly on science-related flashcards. The platform can enable a teacher or administrator to view side-by-side comparisons of students or teachers within this dashboard.

Using this dashboard, an administrator can quickly identify which teachers are performing well and which teachers are not. In the depicted example, an administrator may determine that Liam Johnston could benefit from discussing teaching techniques with Zoey Benjamin. Similarly, the dashboard would allow a teacher to quickly identify students that may need more practice on a particular subject. In some embodiments, the dashboard may even provide an option for a teacher or administrator to assign a flashcard to a student for a particular subject. The ability to generate this dashboard is facilitated by the structure of the underlying databases and the functionality that API server 202 provides for accessing the data.

In some embodiments, the platform can be configured to employ artificial intelligence to automatically present recommendations to an administrator for addressing learning deficiencies, teaching deficiencies and educational content deficiencies. For example, backend server 204 could be configured to identify which learning standard sections have a MissCnt and to compare these learning standard sections to the weights that the school has assigned to these sections. Based on the weights and the MissCnt values, backend server 204 can automatically notify the administrator (e.g., within the dashboard) that flashcards should be created for specific learning standard sections. API server 202 can also provide functionality by which the administrator can automatically notify teachers to create flashcards for these learning standard sections. Accordingly, the platform facilitates identifying and addressing a deficiency in learning content that is of most importance to school.

The platform can automatically address a learning deficiency by identifying students or teachers that are falling short in a particular learning standard section. For example, backend server 204 could be configured to periodically review outcomes database 216 to identify, based on flashcard results, students that are underperforming in a particular learning standard section and/or teachers whose students are underperforming. Backend server 204 can then automatically present recommendations to the administrator and provide options for the administrator to issue flashcard decks to the underperforming students or to request that one teacher assist another teacher whose students are underperforming.

Figure 8:
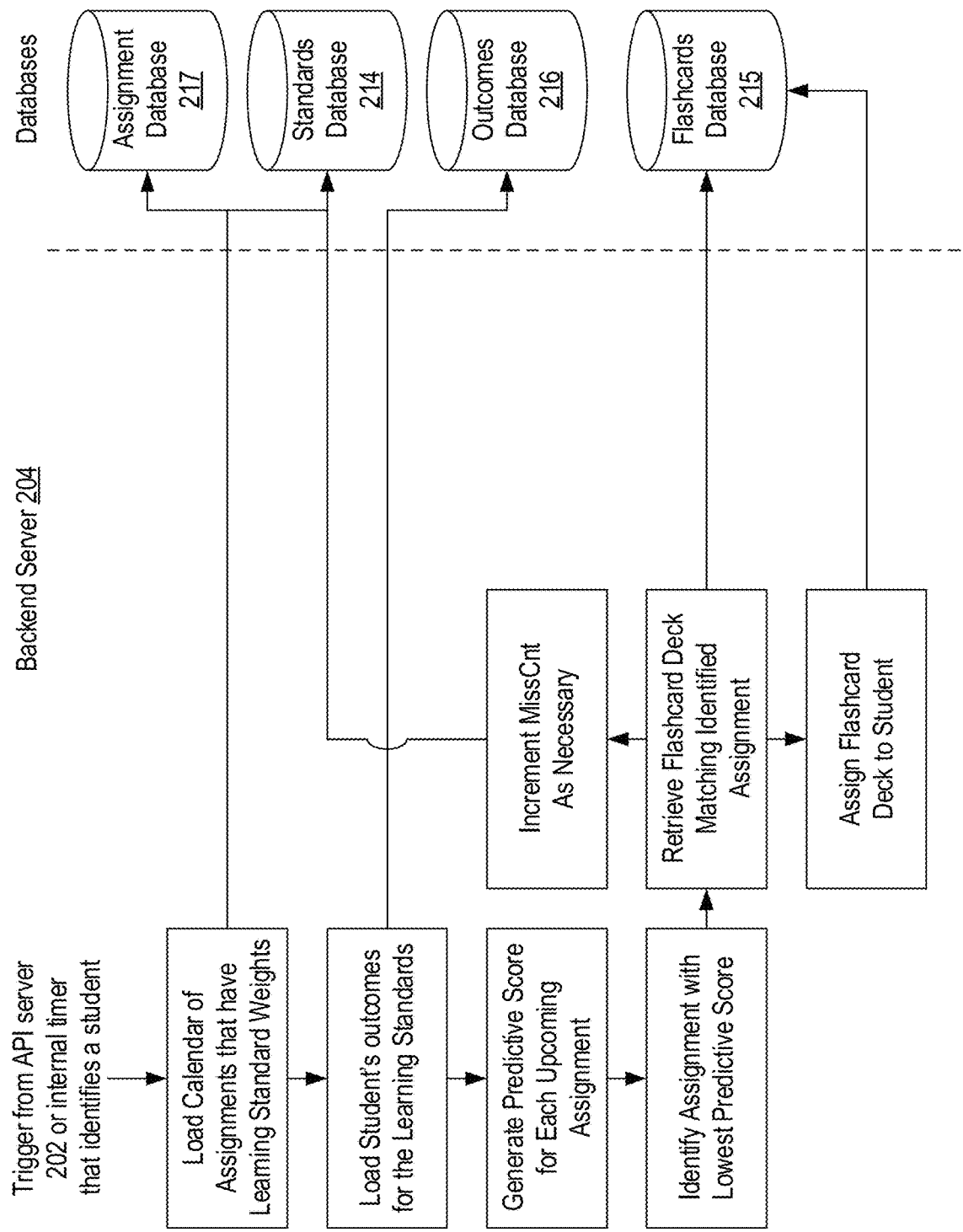
FIG. 8 illustrates how the platform can automatically identify and assign a flashcard deck to a student that is based on predictive scores for the student's upcoming assignments.

FIG. 8 illustrates how backend server 204 can automatically identify and assign a flashcard deck to a student that is based on predictive scores for the student's upcoming assignments. In this context, an assignment should be construed as an upcoming quiz, test or assessment that the student will take. Assignments can be defined in assignment database 217 as described above. For example, a teacher or other user could employ a webpage or other interface of web server 201 to input each student's upcoming quiz, test or assessment, and in response, API server 202 can populate assignment table 217a accordingly.

As shown in FIG. 8, backend server 204 can perform this process for a particular student in response to a trigger received from API server 202, an internal timer or some other input. As an example, backend server 204 could be configured to periodically trigger this process to ensure that any student that has not performed well is assigned a flashcard deck with sufficient time to prepare for the corresponding upcoming assignment. Additionally, API server 202 could request backend server 204 to perform this process (e.g., in response to a request from a teacher during a flashcard session, in response to a request from a student (e.g., using a digital assistant), in response to a request from a teacher or administrator (e.g., while viewing a dashboard)).

Regardless of how the process is initiated, backend server 204 can access assignment database 217 to load each of the student's assignments and can access standards database 214 to retrieve the weights of each learning standard section that is applicable to the assignments. As was suggested above, standards database 214 can define a weight for each learning standard item which represents a school's priority for that learning standard section. The use of weights in this process can ensure that emphasis is placed on the learning standard sections that the school prioritizes.

Backend server 204 can also retrieve the student's outcomes from outcomes database 216 for each learning standard section that is covered by any of the retrieved assignments. Backend server 204 can employ these outcomes to generate a predictive score for each of the assignments. For example, each assignment can identify a form which, as described above, may include a form composition that identifies the percentage of questions that relate to each learning standard section. Using the form composition and the student's outcome related to each learning standard section, backend server 204 can predict how the student will perform on the assignment. For example, if the student has only answered 15% of flashcards related to section 8.G.A.1 correctly and half of the questions in the assignment are related to section 8.G.A.1, backend server 204 can predict that the student is likely to perform poorly. As described above, the calculation of a predictive score can decay the student's older results.

With a predictive score generated for each assignment, backend server 204 can then identify which assignment has the lowest predictive score. Backend server 204 can then query flashcards database 215 to retrieve a flashcard deck that matches the form composition of the identified assignment. For example, if the form composition for a math test defines that 30% of the questions relate to 8.G.A.1 and 70% relate to 8.SP.A.1. backend server 204 can create a flashcard deck that includes 30% flashcards related to 8.G.A.1 and 70% flashcards related to 8.SP.A.1.

If flashcards database 215 does not include sufficient flashcards for a particular learning standard section, backend server 204 can increment the MissCnt field in outcomes database 216 in the manner described above. Once the flashcard deck, which may include any desired number of flashcards, has been created, backend server 204 can assign the flashcards to the student by submitting appropriate queries to flashcard database 215.

Backend server 204 can also employ these predictive scores to notify an administrator of the school's expected results on a state or national assessment. For example, by aggregate the predictive scores of all students, backend server 204 can present a breakdown of how the school is likely to perform on the various learning standard sections that will be covered in a particular assessment. As described above, the platform can enable the administrator to assign flashcards to students to address learning standard sections where the school is predicted to fall short.

FIGS. 9A-9D provide examples of user interfaces (e.g., webpages) that web server 201 can provide to enable a teacher or administrator to create a form. As described above, these user interfaces can include form builder 400 that is configured to invoke APIs that API server 202 provides.

Figure 9A:
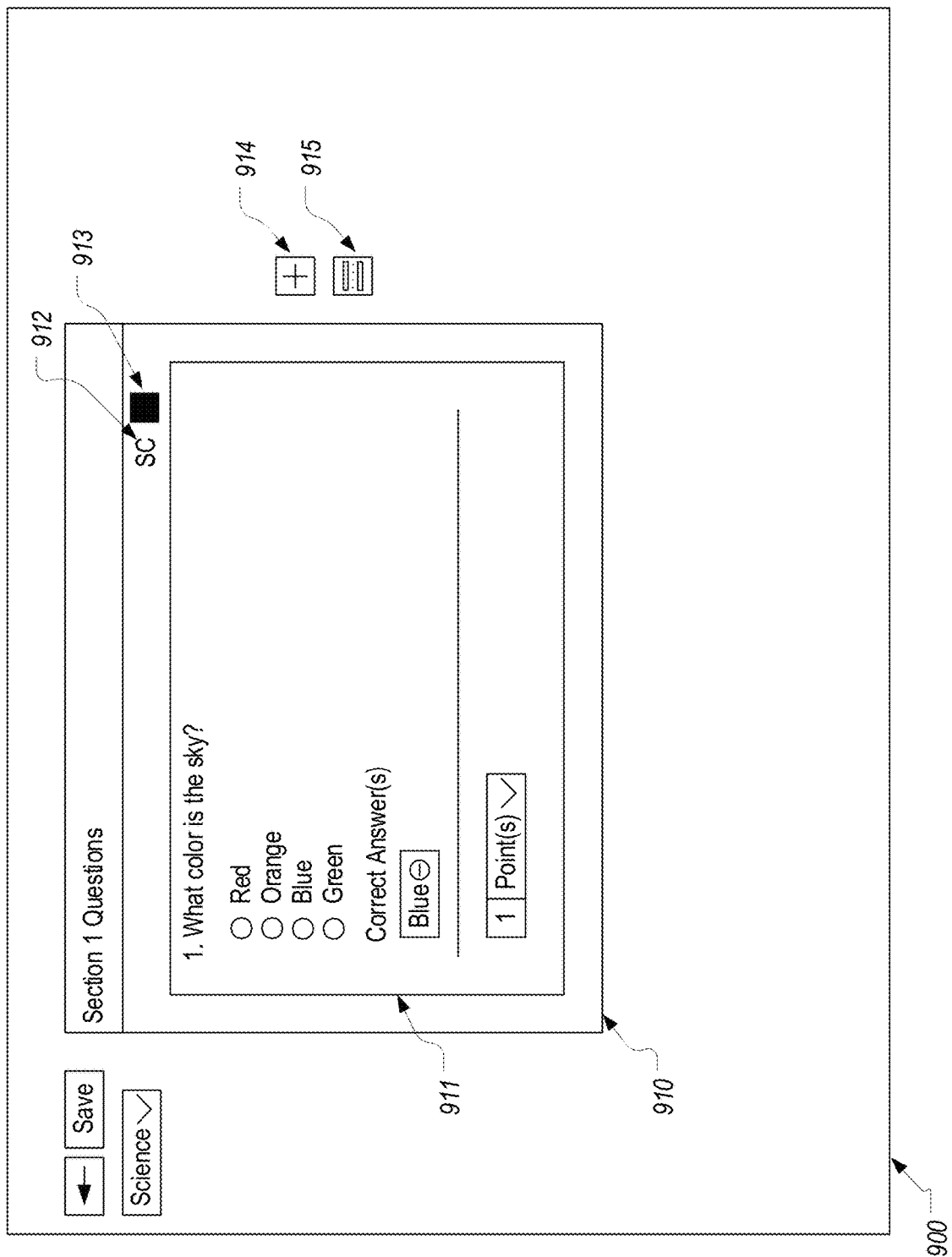
FIGS. 9A-9D illustrate examples of user interfaces that can be presented to a teacher to allow the teacher to create a form representing an assessment and to create flashcards from questions defined within the form.

FIG. 9A illustrates a user interface 900 that includes a form section 910 (which is named Section 1) within which the teacher can create questions, such as question 911, for the section. Question 911 is in the form of a multiple choice question. Form builder 400 can be configured to allow the teacher to input the question, possible answers, the correct answer and the point value for the question among other things.

Each section can be associated with a portion of a learning standard. For example, form section 910 includes an element 912 indicating that Section 1 is currently associated with classification SC of TEKS. Element 912 may initially be set to a default value (i.e., to the classification alone) based on the subject matter/class for which the form is being created (which is Science in this example). Form section 910 also includes a learning standard configuration element 913 that can be selected to define the sub-classification of the learning standard with which the section is associated. An element 914 for adding a question and an element 915 for adding a section can also be included in user interface 900 next to form section 910.

Figure 9B:
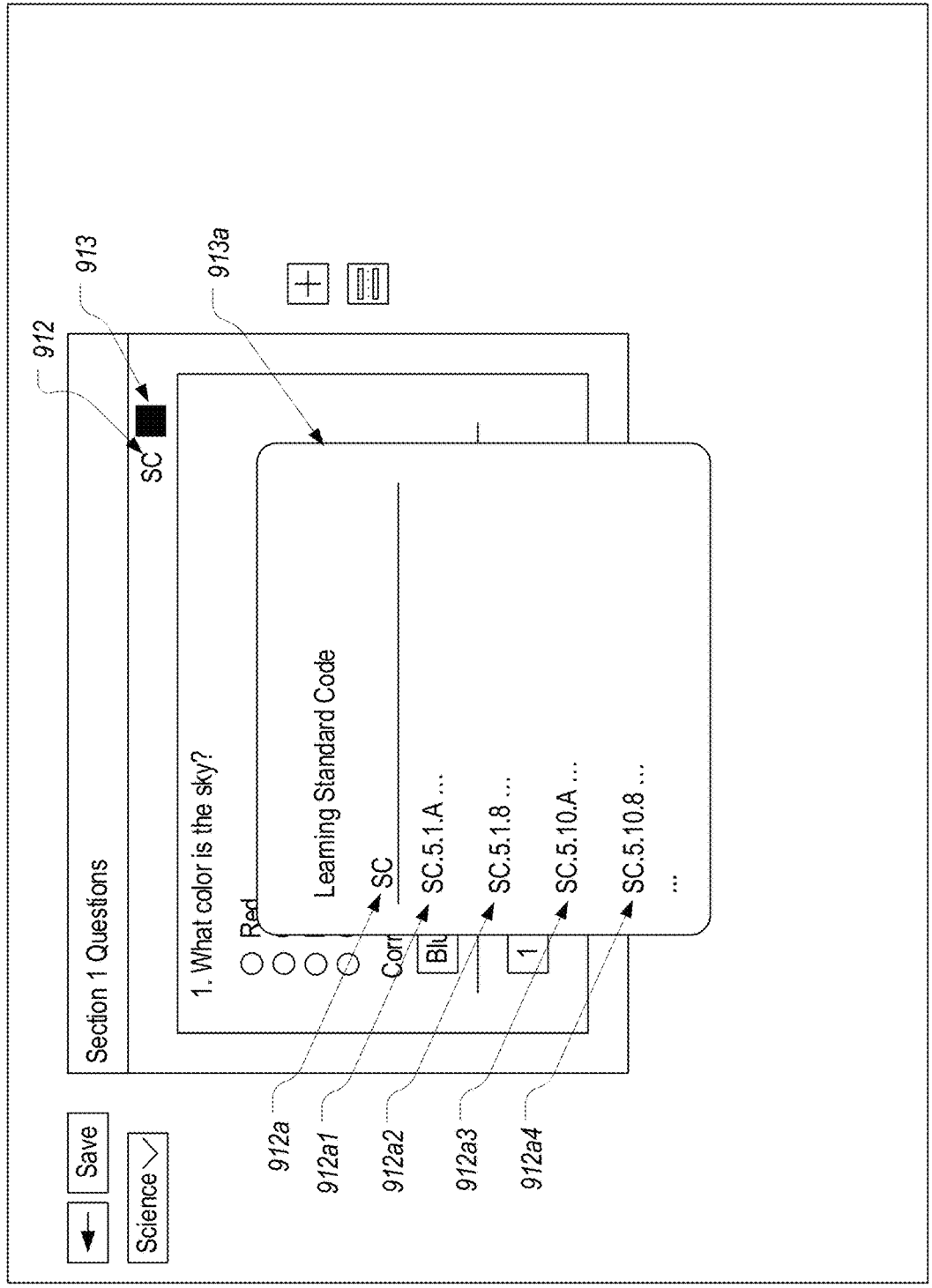

FIG. 9B illustrates how user interface 900 can be updated when the teacher selects learning standard configuration element 913. As shown, a dialog 913a is displayed when the teacher selects learning standard configuration element 913. Dialog 913a can allow the teacher to input a learning standard classification and one or more sub-classification levels into a search area 912a. As shown, search area 912a may initially be populated with the value of element 912. Sub-classifications that match the input to search area 912a (e.g., sub-classifications 912a1-912a4) can be displayed to allow the teacher to select a desired sub-classification.

Figure 9C:
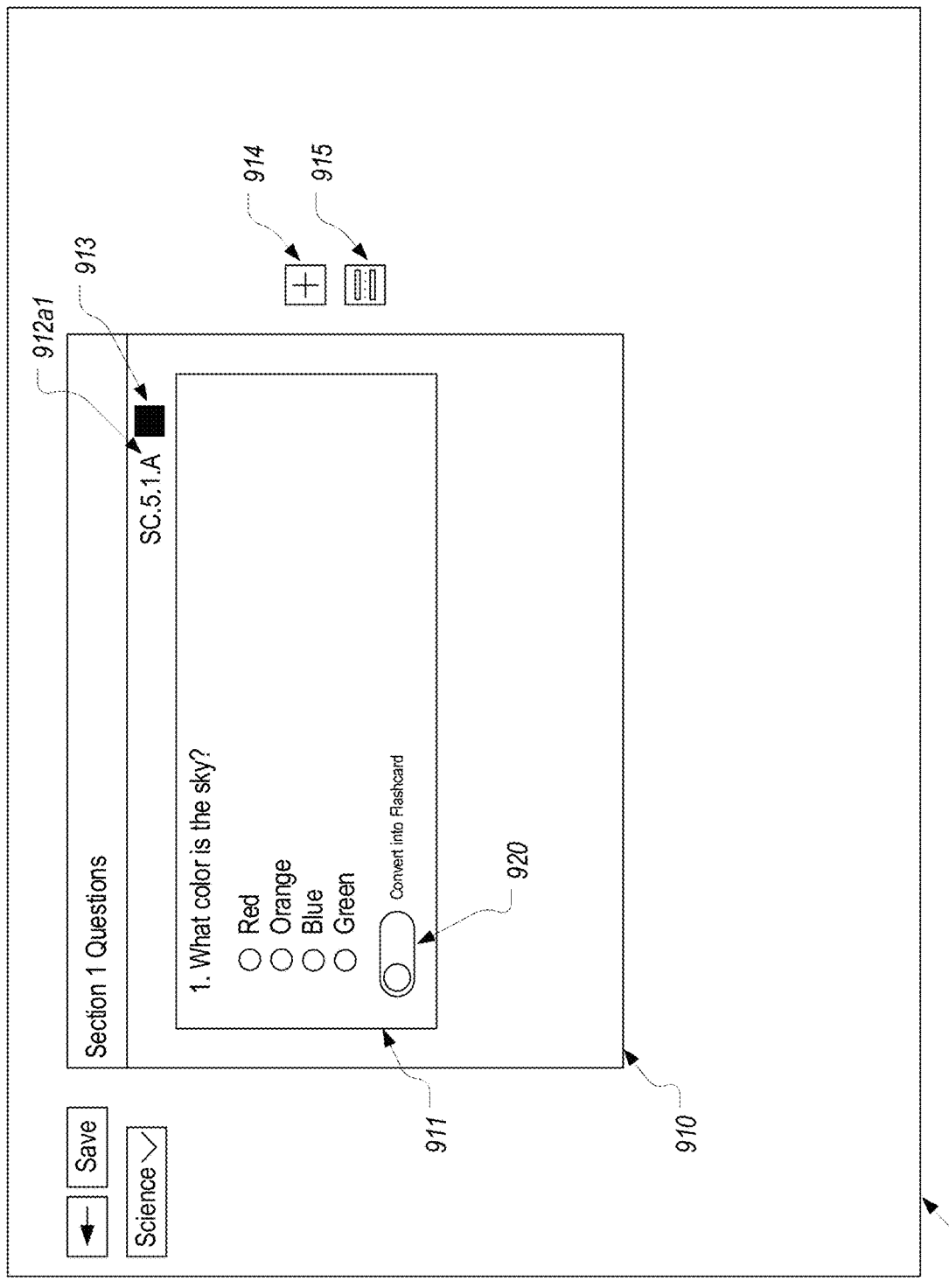

Turning to FIG. 9C, it is assumed that the teacher has selected sub-classification SC.5.1.A to be associated with Section 1. With a sub-classification selected for this section, form builder 400 will cause a create flashcard element 920 to be displayed in conjunction with any question defined in the section. In other words, form builder 400 does not allow a flashcard to be created for a question until the question has been associated with a specific classification and sub-classification of a learning standard. As shown, create flashcard element 920 allows the teacher to request that a flashcard be created for the question and therefore corresponds to create flashcard button 401 shown in FIG. 4B.

Figure 9D:
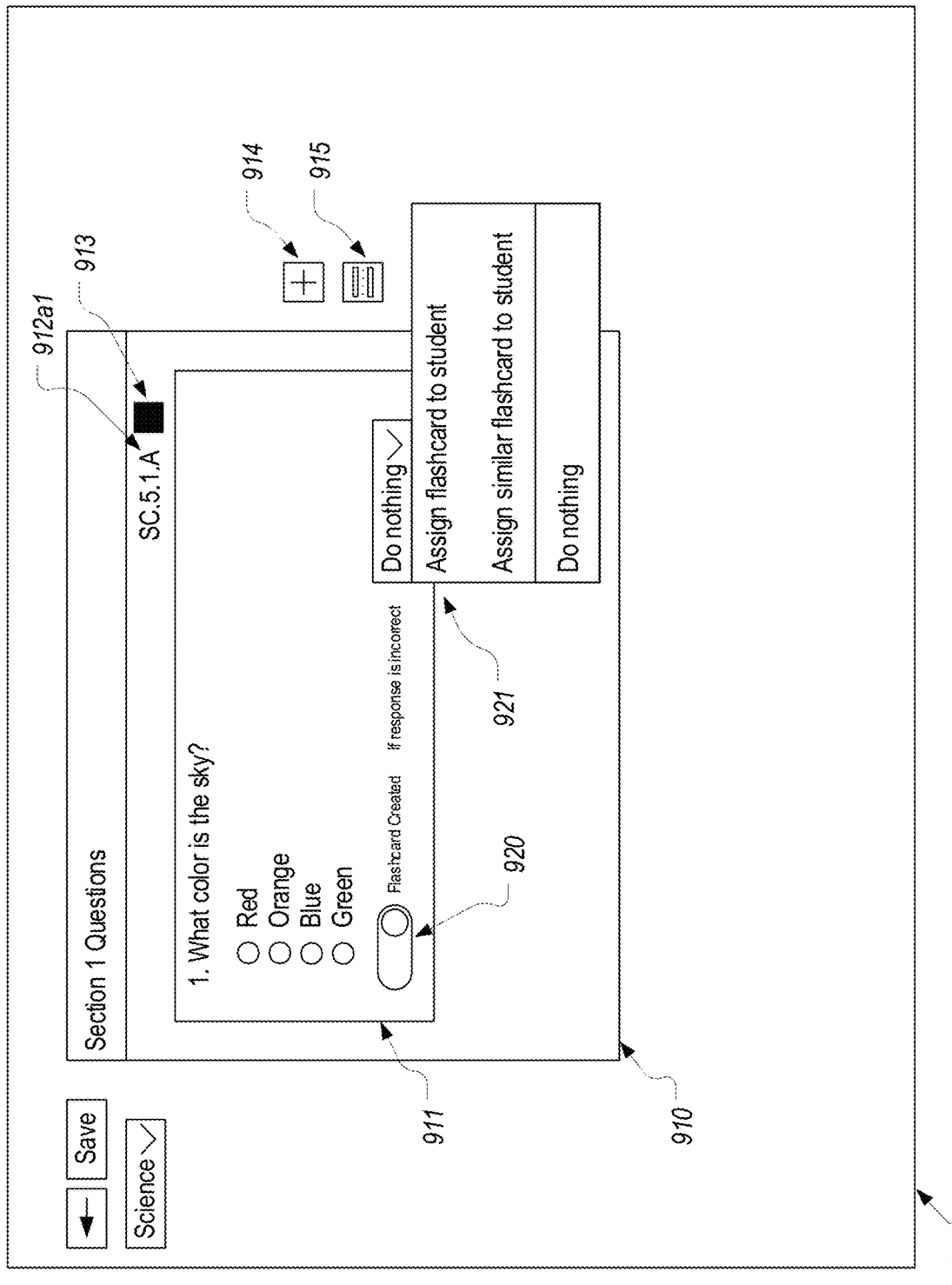

In FIG. 9D, it is assumed that the teacher has selected create flashcard element 920. This selection can trigger the sending of question data to API server 202 as represented in step 2 of FIG. 4B. FIG. 9D also shows that form builder 400 has updated user interface 900 to provide an option to specify an action to be performed when the question is answered incorrectly when a student takes the assessment that the from defines. These options include assigning the flashcard to the student, assigning a similar flashcard to the student or doing nothing as was described above. In this way, a teacher can cause the created flashcard to be automatically assigned to students that miss the question from which the flashcard was created. Because flashcards can be created from within the same form in which quizzes, tests or other assessments are created, a large collection of flashcards can be created with little additional effort.

FIGS. 10A-10F provide examples of user interfaces that web server 201 can provide to enable a teacher or administrator to create or select a flashcard deck to be used during a flashcard session. These user interfaces therefore correspond with the process shown in FIG. 5A.

Figure 10A:
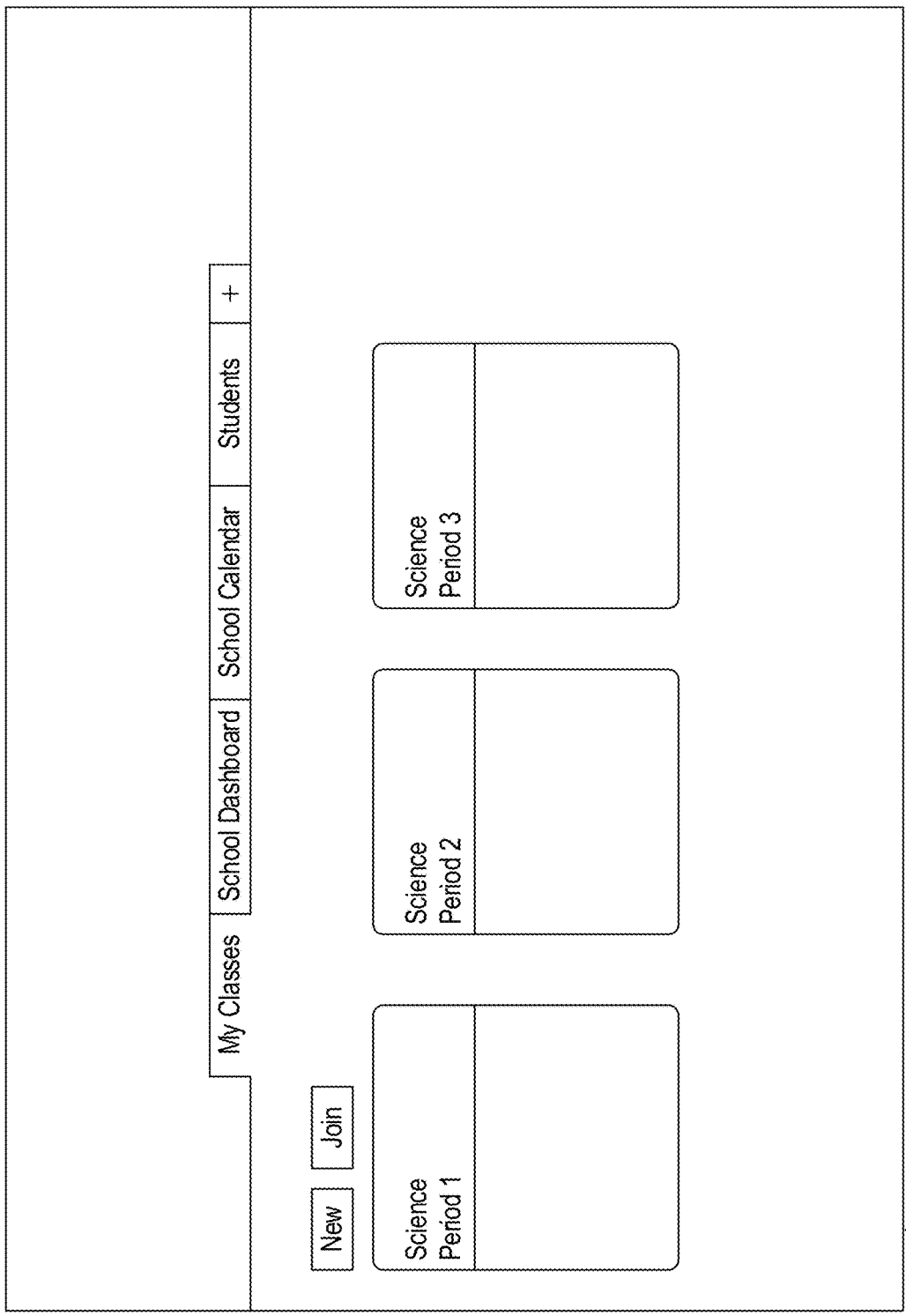
FIGS. 10A-10F illustrate examples of user interfaces that can be presented to a teacher to allow the teacher to create or select a deck for use in a flashcard session.
Figure 10B:
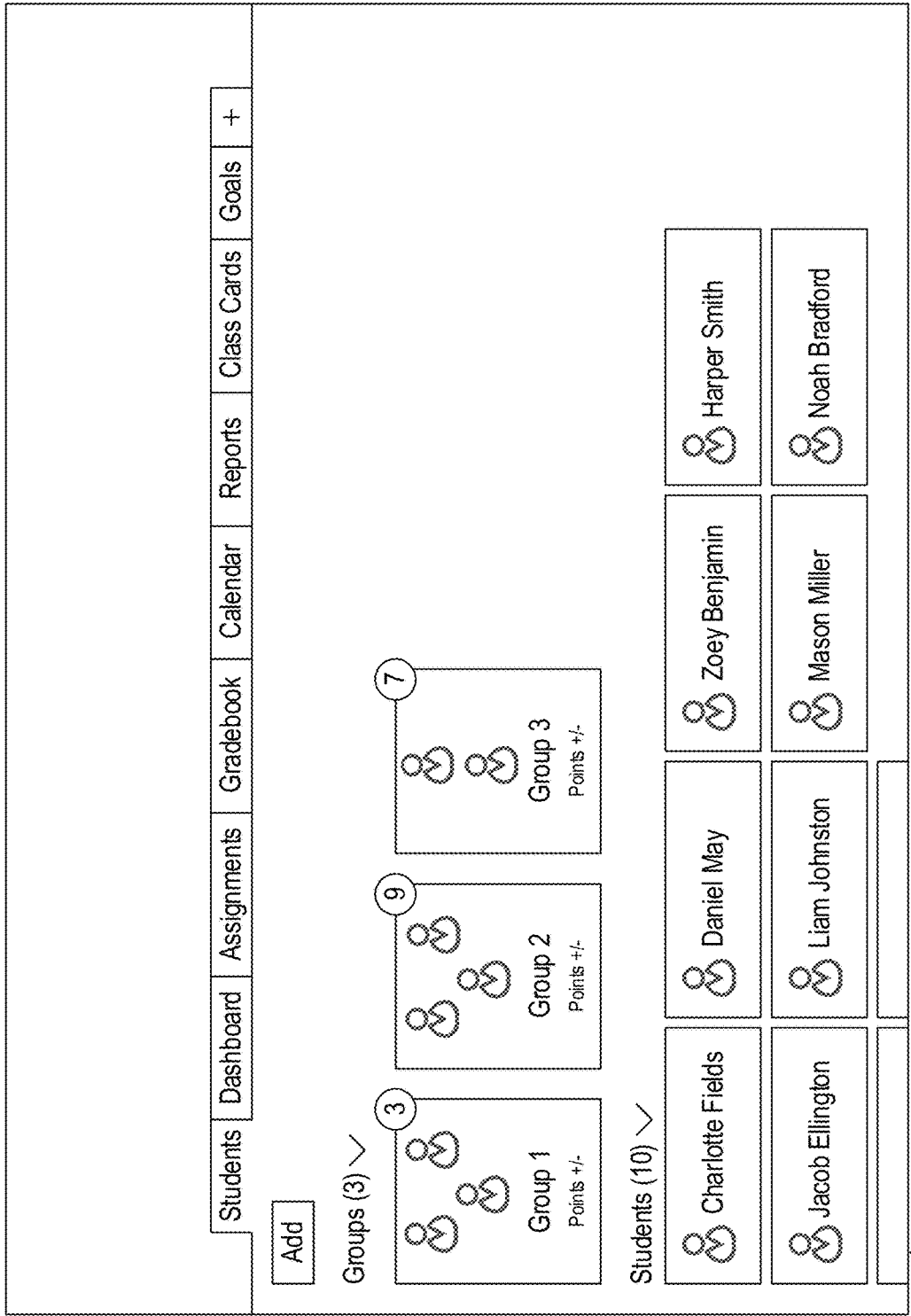

FIG. 10A illustrates a user interface 1000 that can be displayed to a teacher when he or she is logged in to the system. User interface 1000 includes each of the teacher's classes, each of which is selectable to allow the teacher to view details of each class. In FIG. 10B, it is assumed that the teacher has selected the Science Period 1 class and therefore, user interface 1000 has been updated to show students that are in the Science Period 1 class and various groups of these students. As shown along the top of user interface 1000, there are various class-specific tabs including a Class Cards tab that can be selected to initiate a flashcard session in the class.

Figure 10C:
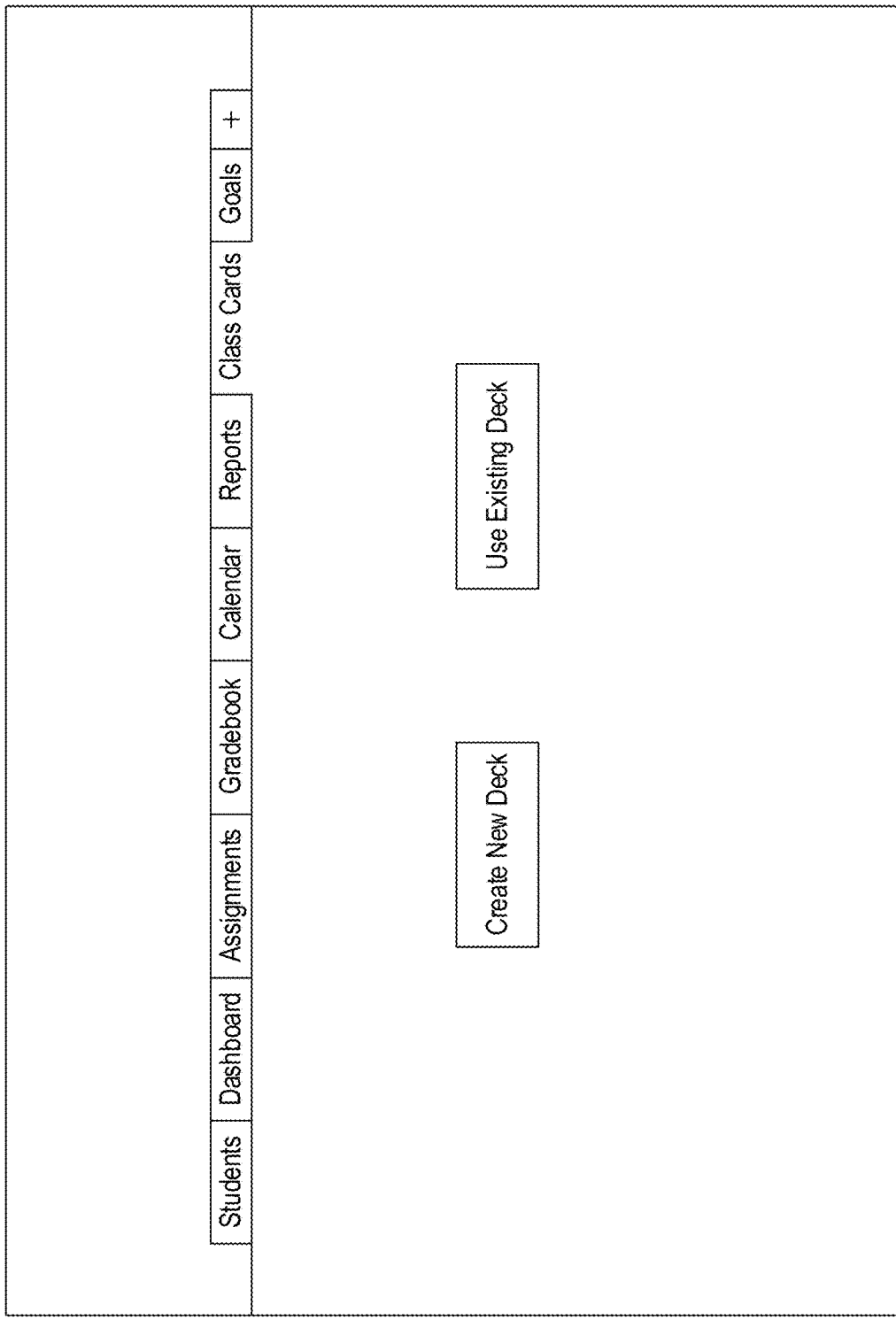
Figure 10D:
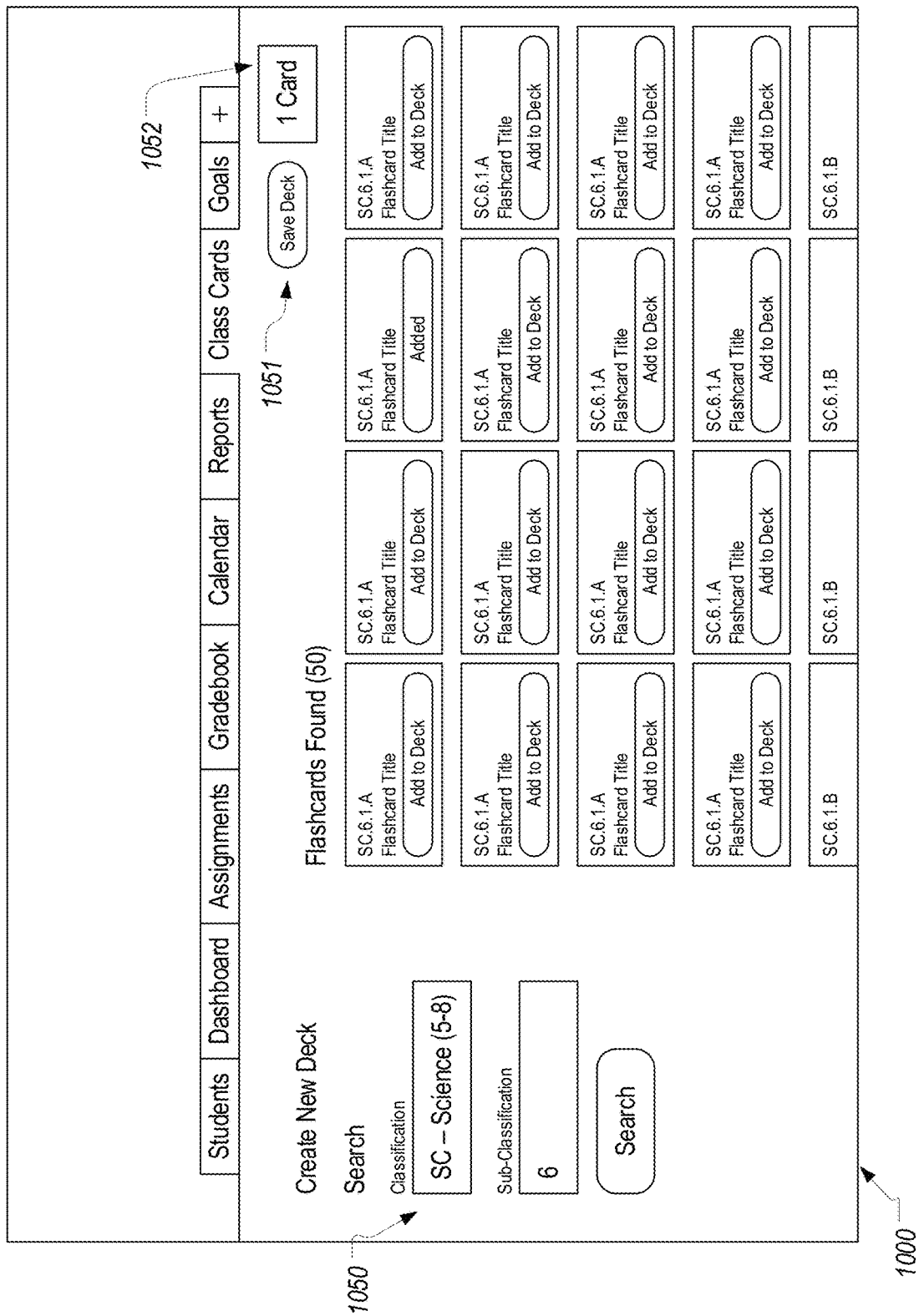

In FIG. 10C, it is assumed that the teacher has selected the Class Cards tab. As a result, user interface 1000 has been updated to display an option to create a new flashcard deck and an option to select an existing flashcard deck. FIG. 10D provides an example of how user interface 1000 may appear when the teacher selects to create a new flashcard deck. As shown, user interface 1000 includes a search mechanism 1050 which allows the teacher to search for flashcards that match a specified classification and sub-classification. As described above, search mechanism 1050 can be configured to interface with API server 202 to retrieve flashcards from flashcards database 215 which match the search criteria.

In FIG. 10D, it is assumed that the teacher has specified search criteria of SC for the classification and 6 for the sub-classification and that 50 matching flashcards were found in flashcards database 215. Therefore, representations of these 50 matching flashcards are presented in user interface 1000 along with an option to add the flashcard to the deck that is being created. It is also assumed that the teacher has selected to add one of the flashcards to the deck. Accordingly, an element 1052 indicates that one card has been added. A button 1051 allows the teacher to save the deck once the desired flashcards have been added. Although not shown in FIG. 3E, flashcard database 215 can include a data structure which defines decks that have been created including identifying which teacher created the deck.

Figure 10E:
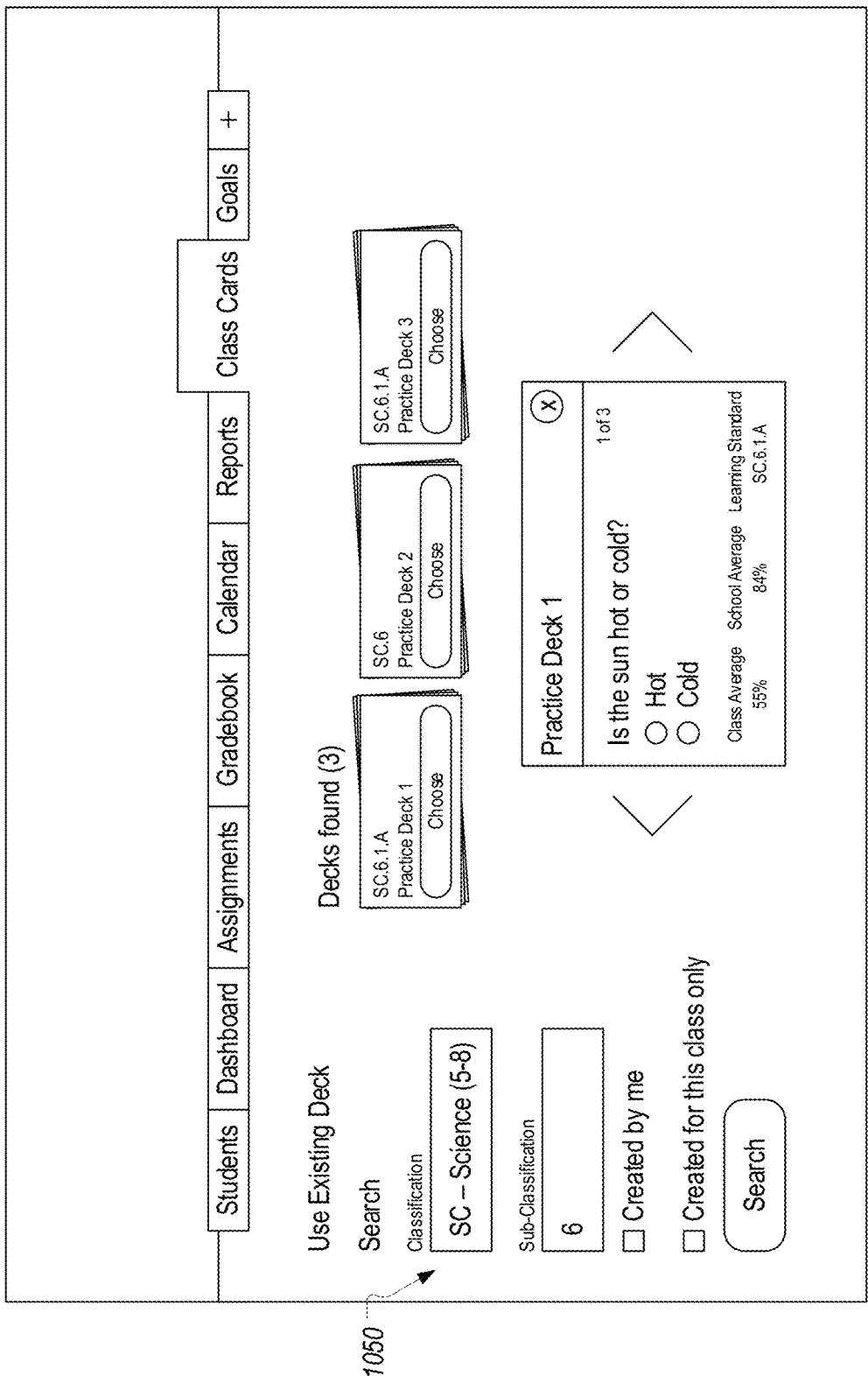

FIG. 10E represents how user interface 1000 may appear when the teacher selects the option to use an existing deck. As shown, a similar search mechanism 1050 can be provided to allow the teacher to search for decks that match a particular classification/sub-classification. Additionally, search mechanism 1050 can provide an option to limit the search to decks that the teacher created or decks that were created for the particular class. In FIG. 10E, it is assumed that the teacher has searched for decks matching the SC.6 classification/sub-classification and that three matching decks were found. It is also assumed that the teacher has clicked on (but not yet chosen) the deck named "Practice Deck 1." This selection causes a preview of Practice Deck 1 to be displayed which allows the teacher to step through each flashcard in the deck. As shown, each flashcard can be associated with a class average and a school average. These averages represent the percentage of correct answers that students within the class and within the school respectively have provided on this flashcard.

Figure 10F:
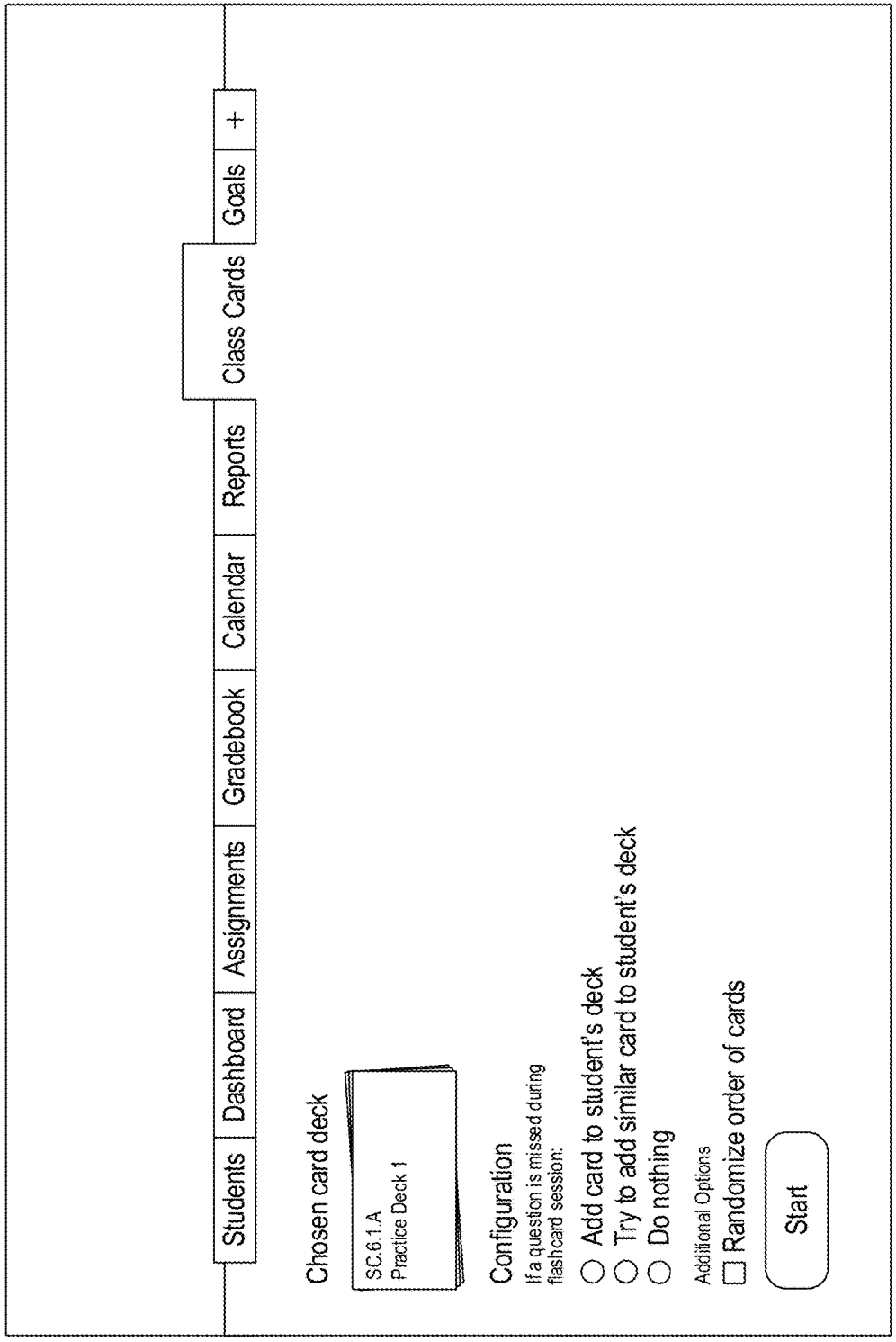

In FIG. 10F, it is assumed that the teacher has chosen to use Practice Deck 1 for the flashcard session. As a result, user interface 1000 has been updated to display Practice Deck 1 as the chosen deck and to provide configuration options for the flashcard session. For example, in a similar manner as described above with reference to questions defined in a form, when a student provides an incorrect answer during a flashcard session, the flashcard or a similar flashcard may be assigned to the student's flashcard deck. Once the teacher has completed the configurations, the start button can be selected to commence the flashcard session.

Figure 11A:
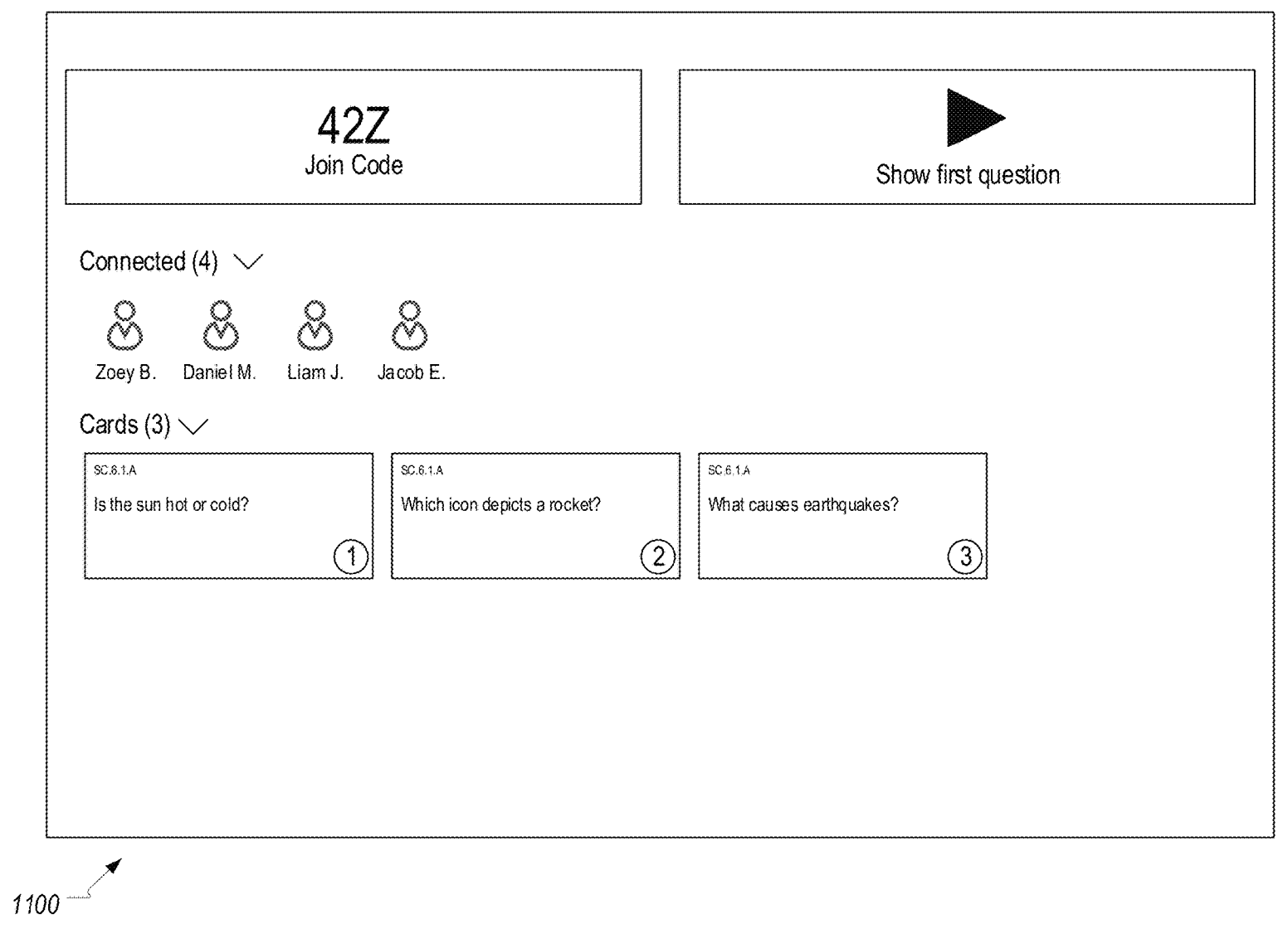
Figure 11B:
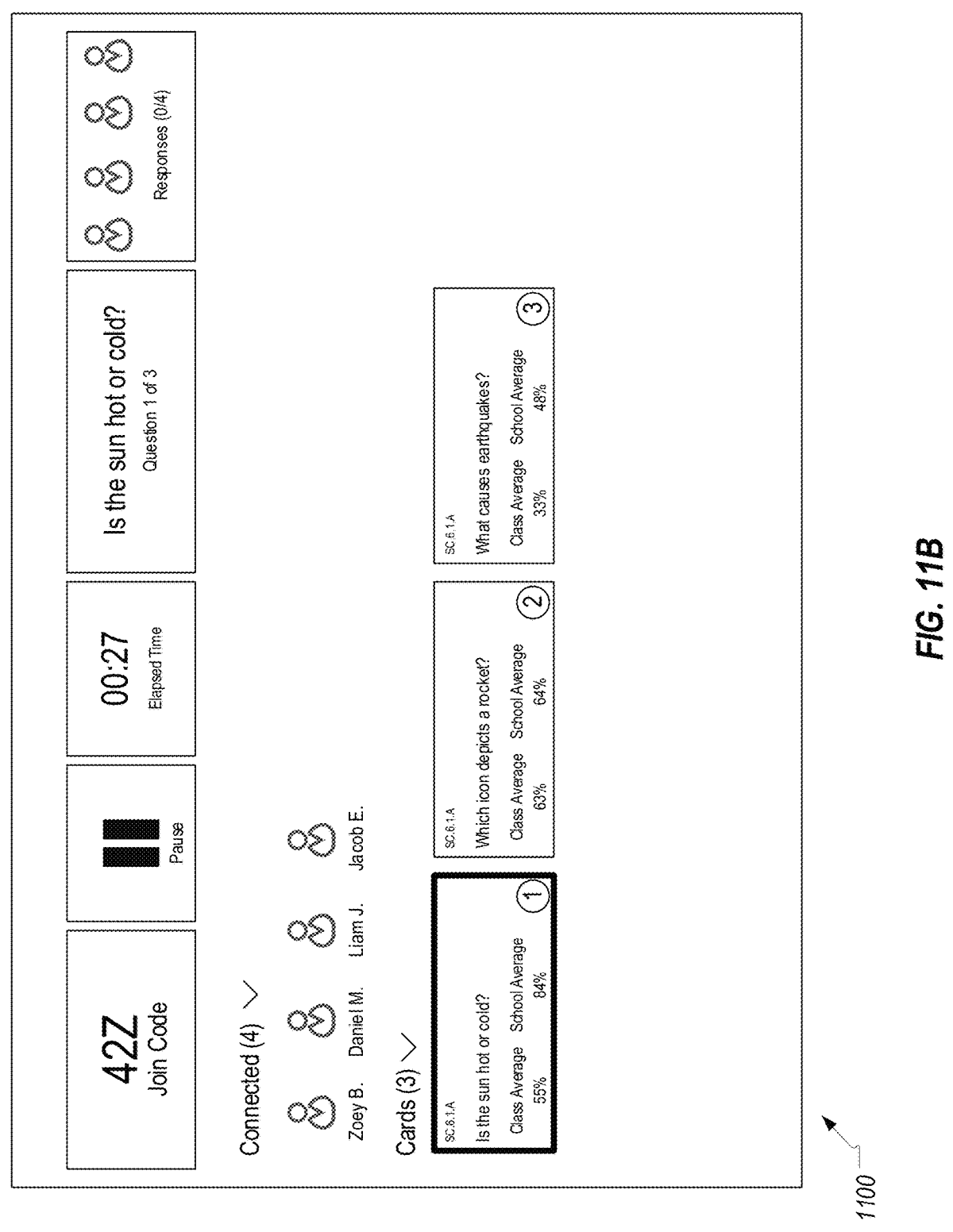
Figure 11C:
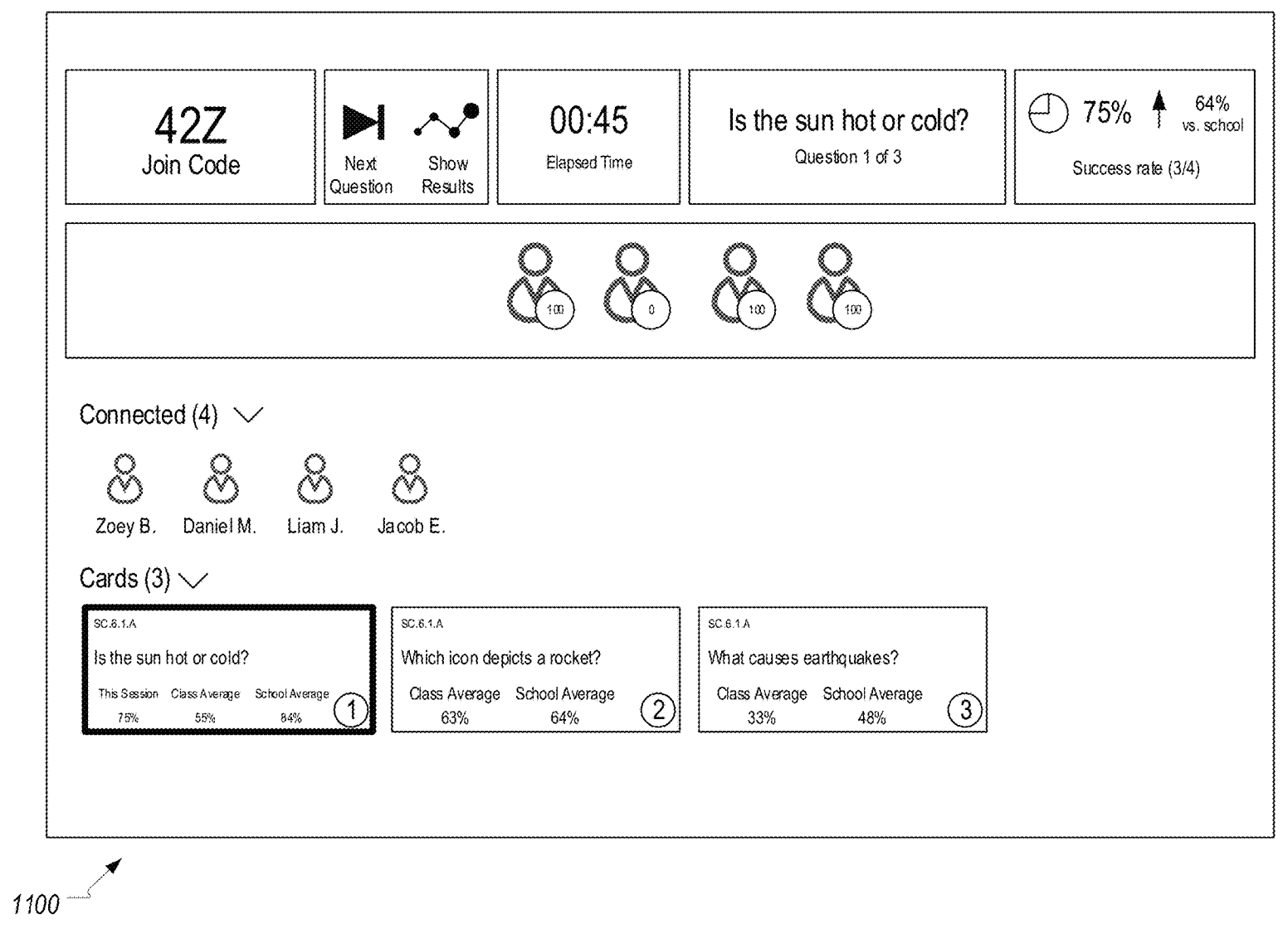
Figure 11D:
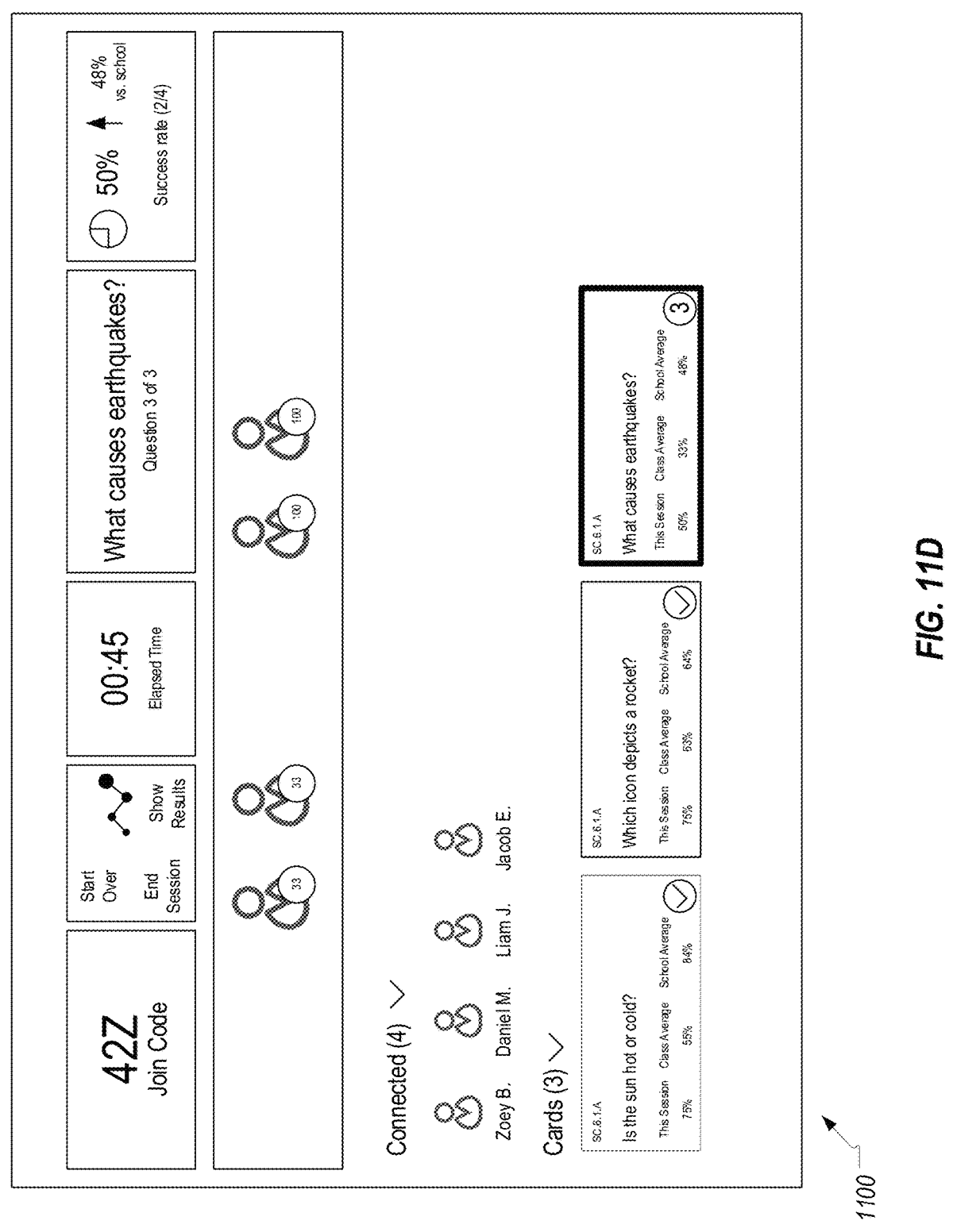
Figure 12A:
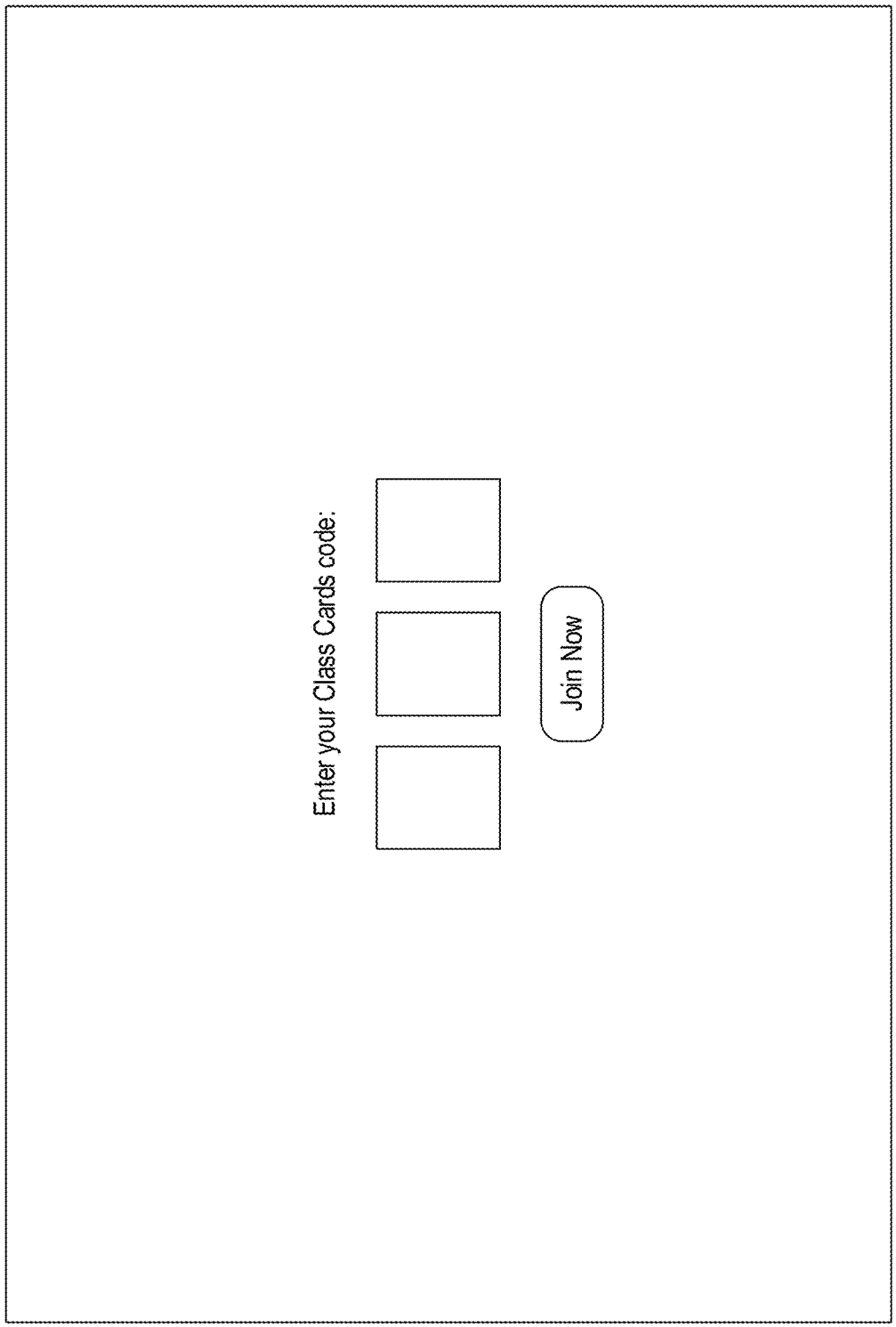

FIGS. 11A-11D represent user interfaces that can be displayed on the teacher's client device during a flashcard session while FIGS. 12A-12C represent user interfaces that can be displayed on the students' client devices during the flashcard session. FIG. 11A illustrates a user interface 1100 that can be presented to the teacher before the first flashcard has been displayed to the students. As shown, user interface 1100 provides a Join Code that the students can use to join the flashcard session (see FIG. 12A) and an option to show the first question (or flashcard). User interface 1100 also identifies which students have connected to the flashcard session which in this example includes Zoey B., Daniel M., Liam J. and Jacob E. User interface 1100 also shows each of three flashcards that are included in the chosen Practice Deck 1.

In FIG. 11B, it is assumed that the teacher has either selected the "show first question" option or selected the first flashcard directly. In response, user interface 1100 has been updated to highlight that question 1 (or the first flashcard) is currently being presented to the students. User interface 1100 has also been updated to identify an elapsed time for this question, an option to pause the question, a listing of the question and its position in the flashcard session (Question 1 of 3) and an identification of which students have responded. In FIG. 11B, it is assumed that none of the four students has responded. FIG. 12B represents how user interface 1200 can appear when the teacher has presented the first flashcard to the students.

In FIG. 11C, it is assumed that each of the students has provided an answer to the first question via user interface 1200 as shown in FIG. 12B. Accordingly, user interface 1100 has been updated to reflect which students answered correctly and to provide corresponding statistics. For example, it is assumed that three of the four students answered correctly, and therefore, user interface 1100 has been updated to reflect a success rate of 75 and to compare this success rate to the school's success rate on this flashcard. User interface 1100 also includes a representation of each student and the student's running score for the flashcard session. For example, given that this is the first question, three of the four students have a score of 100% and the fourth student has a score of 0%. The display of the flashcard within user interface 1100 has also been updated to reflect the class's percentage (75) during this flashcard session so that it can be compared to the class average and the school average. The answer and statistics can also be presented to the student as shown in FIG. 12C. User interface 1200 in FIG. 12C represents what would be shown to the student that answered the question incorrectly.

As was described above, these updates to user interface 1100 are performed by API server using the underlying databases. For example, when the student provides an answer in user interface 1200, API server 202 can add an entry in outcomes database 216. Also, if the student answers incorrectly and the teacher has configured the flashcard session to assign the flashcard when the corresponding question is answered incorrectly, API server 202 can update flashcards database 215 to assign the flashcard or a similar flashcard to the student as described above. Further, if a flashcard used in a flashcard session is also assigned to the student's personal deck, the student's deck will be updated in the same manner described above based on the student's answer during the flashcard session.

In FIG. 11D, it is assumed that the flashcard session has proceeded through the last question. As shown, the running scores for the students indicate that two of the students answered all three questions correctly while the other two students answered one of the three questions correctly. These statistics and results can also be presented to the students.

User interface 1100 has also been updated to group together students with similar running scores. This grouping facilitates issuing awards to students that have performed similarly. For example, user interface 1100 can allow each grouping to be selected and can then display an option for issuing points, badges or another type of award in a similar manner as described in U.S. patent application Ser. No. 15/197,519 which is incorporated herein by reference. An award may be issued to reward students that have performed well or to encourage students that have tried hard but fallen short.

In summary, the platform of the present invention employs a unique arrangement of server-side components and functionality that facilitate the process of identifying and presenting learning content that is personalized for each student. With the platform, a teacher or administrator can better identify where each student may be falling short and can easily present learning content to address the specific learning standard sections where the student needs to improve.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed in a computing environment that includes a server architecture and a plurality of client devices, for creating flashcards using a digital assessment form comprising:

providing, by a web server of the server architecture and to a user of a first client device of the plurality of client devices, a user interface that includes a digital assessment form that is configured to receive input defining questions and corresponding answers, each question being associated with a learning standard section;

receiving, at an API server of the server architecture and in response to the user's interaction with the digital assessment form provided in the user interface, a first request to create a flashcard for a first question that has been defined in the digital assessment form, the first request identifying the first question, the corresponding answer and the associated learning standard section;

in response to the first request, creating, by the API server and in a flashcards database, one or more entries that define a first flashcard for the first question, the one or more entries mapping the first question to the associated learning standard section;

receiving, by the API server, a second request to assign the first flashcard to a first student;

in response to the second request, creating, by the API server and in the flashcards database, one or more entries that associate the first student with the first flashcard, wherein the one or more entries that associate the first student with the first flashcard define a slot value that assigns the first flashcard to a particular slot of a plurality of slots in a slot structure associated with the first student, each slot in the slot structure being associated with a different probability of selection, wherein the flashcards database includes entries that associate the first student with a plurality of flashcards;

accessing the flashcards database to select one of the plurality of flashcards based on the slot to which each of the plurality of flashcards is assigned such that the selected flashcard is selected based on the probability of selection associated with the slot to which the selected flashcard is assigned;

presenting the selected flashcard to the first student;

in response to presenting the selected flashcard to the first student, receiving an answer;

determining whether the answer is correct;

when the answer is correct, accessing the flashcards database to update the one or more entries that associate the first student with the selected flashcard to change the slot value to assign the selected flashcard to a slot that is associated with a lower probability of selection;

when the answer in incorrect, accessing the flashcards database to update the one or more entries that associate the first student with the selected flashcard to change the slot value to assign the selected flashcard to a slot that is associated with a higher probability of selection; and when the answer is correct and the selected flashcard is currently assigned to a slot that has the lowest probability of selection, accessing the flashcards database to update the one or more entries so that the selected flashcard is no longer assigned to the first student.

2. The method of claim 1, wherein the digital assessment form provides a user interface element by which the user can request creation of a flashcard for a particular question that is currently displayed in the digital assessment form, and wherein the first request is received in response to the user selecting the user interface element while the first question is displayed in the digital assessment form.

3. The method of claim 1, wherein the one or more entries that define the first flashcard also define a classification and one or more sub-classifications for the associated learning standard section.

4. The method of claim 1, wherein
the selected flashcard is presented to the first student by sending content of the selected flashcard to a third party digital assistant application programming interface to cause the content of the selected flashcard to be presented to the first student on a digital assistant.

5. The method of claim 1, further comprising:
presenting the questions defined in the digital assessment form to the first student;
determining that the first student has provided an incorrect answer to a second question that was defined in the digital assessment form;
accessing the digital assessment form to determine whether an incorrect answer event has been defined for the second question; and when the incorrect answer event has been defined for the second question, creating, in the flashcards database, one or more entries that associate the first student with a second flashcard.

6. The method of claim 5, wherein the incorrect answer event defines that the second flashcard should be assigned when the second question is answered incorrectly.

7. The method of claim 5, wherein the incorrect answer event defines that a flashcard related to the learning standard section associated with the second question should be assigned when the second question is answered incorrectly, and wherein the second flashcard is associated with the same learning standard section as the second question.

8. The method of claim 1, further comprising:
creating a flashcard deck for a particular student by creating, in the flashcards database, entries that associate the particular student with a plurality of flashcards.

9. The method of claim 8, wherein the plurality of flashcards are selected for inclusion in the flashcard deck based on the particular student's predictive score on an upcoming assignment.

10. The method of claim 8, wherein the plurality of flashcards are selected for inclusion in the flashcard deck based on the particular student's answers on flashcards that were previously presented to the particular student.

11. The method of claim 1, further comprising:
presenting flashcards that are defined in the flashcards database to a plurality of students;
storing, in an outcomes database, entries that define the plurality of students' results on the flashcards; and
generating, from the outcomes database, a dashboard that represents the plurality of students' performance on at least one learning standard section.

12. Once or more computer storage media storing computer executable instructions which, when executed in a computing environment that includes a server architecture and a plurality of client devices, implement a method for creating flashcards using a digital assessment form comprising:
providing, by a web server of the server architecture and to a user of a first client device of the plurality of client devices, a user interface that includes a digital assessment form that is configured to receive input defining questions and corresponding answers, each question being associated with a learning standard section;
receiving, at an API server of the server architecture and in response to the user's interaction with the digital assessment form provided in the user interface, a first request to create a flashcard for a first question that has been defined in the digital assessment form, the first request identifying the first question, the corresponding answer and the associated learning standard section;
in response to the first request, creating, by the API server and in a flashcards database, one or more entries that define a first flashcard for the first question, the one or more entries mapping the first question to the associated learning standard section;
receiving, by the API server, a second request to assign the first flashcard to a first student;
in response to the second request, creating, by the API server and in the flashcards database, one or more entries that associate the first student with the first flashcard, wherein the one or more entries that associate the first student with the first flashcard define a slot value that assigns the first flashcard to a particular slot of a plurality of slots in a slot structure associated with the first student, each slot in the slot structure being associated with a different probability of selection, wherein the flashcards database includes entries that associate the first student with a plurality of flashcards;
accessing the flashcards database to select one of the plurality of flashcards based on the slot to which each of the plurality of flashcards is assigned;
presenting the selected flashcard to the first student;
in response to presenting the selected flashcard to the first student, receiving an answer;
determining whether the answer is correct;
when the answer is correct, accessing the flashcards database to update the one or more entries that associate the first student with the selected flashcard to change the slot value to assign the selected flashcard to a slot that is associated with a lower probability of selection;
when the answer in incorrect, accessing the flashcards database to update the one or more entries that associate the first student with the selected flashcard to change the slot value to assign the selected flashcard to a slot that is associated with a higher probability of selection; and
when the answer is correct and the selected flashcard is currently assigned to a slot that has the lowest probability of selection, accessing the flashcards database to update the one or more entries so that the selected flashcard is no longer assigned to the first student.

13. The computer storage media of claim 12, wherein the digital assessment form provides a user interface element by which the user can request creation of a flashcard for a particular question that is currently displayed in the digital assessment form, and wherein the first request is received in response to the user selecting the user interface element while the first question is displayed in the digital assessment form.

14. The computer storage media of claim 12, wherein the one or more entries that define the first flashcard also define a classification and one or more sub-classifications for the associated learning standard section.

15. The computer storage media of claim 12, wherein the selected flashcard is presented to the first student by sending content of the selected flashcard to a third party digital assistant application programming interface to cause the content of the selected flashcard to be presented to the first student on a digital assistant.

16. The computer storage media of claim 12, the method further comprising:
presenting the questions defined in the digital assessment form to the first student;
determining that the first student has provided an incorrect answer to a second question that was defined in the digital assessment form;
accessing the digital assessment form to determine whether an incorrect answer event has been defined for the second question; and
when the incorrect answer event has been defined for the second question, creating, in the flashcards database, one or more entries that associate the first student with a second flashcard.

17. The computer storage media of claim 16, wherein the incorrect answer event defines that the second flashcard should be assigned when the second question is answered incorrectly.

18. The computer storage media of claim 16, wherein the incorrect answer event defines that a flashcard related to the learning standard section associated with the second question should be assigned when the second question is answered incorrectly, and wherein the second flashcard is associated with the same learning standard section as the second question.

19. The computer storage media of claim 12, the method further comprising:
creating a flashcard deck for a particular student by creating, in the flashcards database, entries that associate the particular student with a plurality of flashcards.

20. The computer storage media of claim 12, the method further comprising:
presenting flashcards that are defined in the flashcards database to a plurality of students;
storing, in an outcomes database, entries that define the plurality of students' results on the flashcards; and
generating, from the outcomes database, a dashboard that represents the plurality of students' performance on at least one learning standard section.

* * * * *